US 8,904,749 B2

(12) United States Patent
Foret

(10) Patent No.: US 8,904,749 B2
(45) Date of Patent: Dec. 9, 2014

(54) INDUCTIVELY COUPLED PLASMA ARC DEVICE

(75) Inventor: Todd Foret, Lafayette, LA (US)

(73) Assignee: Foret Plasma Labs, LLC, The Woodlands, TX (US)

( * ) Notice: Subject to any disclaimer, the term of this patent is extended or adjusted under 35 U.S.C. 154(b) by 612 days.

(21) Appl. No.: 13/282,455

(22) Filed: Oct. 26, 2011

(65) Prior Publication Data

US 2012/0097648 A1  Apr. 26, 2012

(51) Int. Cl.
| | | |
|---|---|---|
| F03H 1/00 | (2006.01) |
| F02C 3/14 | (2006.01) |
| H05H 1/30 | (2006.01) |
| H05H 1/42 | (2006.01) |
| F02C 7/266 | (2006.01) |
| H05H 1/32 | (2006.01) |
| H05H 1/34 | (2006.01) |

(52) U.S. Cl.
CPC .......... *F02C 3/14* (2013.01); *H05H 2001/3489* (2013.01); *H05H 1/30* (2013.01); *F23R 2900/00009* (2013.01); *H05H 1/42* (2013.01); *F02C 7/266* (2013.01); *Y02E 50/12* (2013.01); *F23R 2900/00002* (2013.01); *H05H 2001/3426* (2013.01); *H05H 1/32* (2013.01); *Y02T 50/678* (2013.01)
USPC ....... 60/203.1; 60/202; 60/39.281; 60/39.511

(58) Field of Classification Search
USPC .............. 60/39.821, 39.826, 203.1, 202, 772, 60/736, 39.511, 780, 200.1
See application file for complete search history.

(56) References Cited

U.S. PATENT DOCUMENTS

| 481,979 A | 9/1892 | Stanley |
|---|---|---|
| 501,732 A | 7/1893 | Roeske |

(Continued)

FOREIGN PATENT DOCUMENTS

| JP | 2006501980 A | 1/2006 |
|---|---|---|
| KR | 101999009569 A | 2/1999 |
| KR | 2004-000510 A | 1/2004 |

OTHER PUBLICATIONS

Belani, A., "It's Time for an Industry Initiative on Heavy Oil," JPT Online accessed on Oct. 16, 2007 at http://www.spe.org/spe-app/spe/jpt/2006/06/mangement_heavy_oil.htm, 2 pages.

(Continued)

*Primary Examiner* — Craig Kim
(74) *Attorney, Agent, or Firm* — Daniel J. Chalker; Edwin S. Flores; Chalker Flores, LLP

(57) ABSTRACT

The present invention provides an inductively coupled plasma device with a cylindrical vessel having a first end and a second end, wherein at least a portion of the cylindrical vessel is transparent or semi-transparent to a wave energy. A tangential inlet is connected to or proximate to the first end. A tangential outlet is connected to or proximate to the second end. An electrode housing is connected to the first end of the cylindrical vessel such that a first electrode is (a) aligned with a longitudinal axis of the cylindrical vessel, and (b) extends into the cylindrical vessel. A hollow electrode nozzle is connected to the second end of the cylindrical vessel such that the center line of the hollow electrode nozzle is aligned with the longitudinal axis of the cylindrical vessel. An electromagnetic radiation source that produces a wave energy and is disposed around or within the cylindrical vessel.

32 Claims, 18 Drawing Sheets

(56) References Cited

U.S. PATENT DOCUMENTS

| | | | |
|---|---|---|---|
| 2,784,294 A | 3/1957 | Gravert | |
| 2,898,441 A | 8/1959 | Reed et al. | |
| 2,923,809 A | 2/1960 | Clews et al. | |
| 3,004,189 A | 10/1961 | Giannini | |
| 3,082,314 A | 3/1963 | Arata et al. | |
| 3,131,288 A | 4/1964 | Browning et al. | |
| 3,242,305 A | 3/1966 | Kane et al. | |
| 3,534,388 A | 10/1970 | Ito et al. | |
| 3,567,898 A | 3/1971 | Fein | |
| 3,619,549 A | 11/1971 | Hogan et al. | |
| 3,641,308 A | 2/1972 | Couch, Jr. et al. | |
| 3,787,247 A | 1/1974 | Couch, Jr. | |
| 3,798,784 A | 3/1974 | Kovats et al. | |
| 3,830,428 A | 8/1974 | Dyos | |
| 3,833,787 A | 9/1974 | Couch, Jr. | |
| 4,067,390 A | 1/1978 | Camacho et al. | |
| 4,169,503 A | 10/1979 | Scott | |
| 4,203,022 A | 5/1980 | Couch, Jr. et al. | |
| 4,265,747 A | 5/1981 | Copa et al. | |
| 4,311,897 A | 1/1982 | Yerushalmy | |
| 4,344,839 A | 8/1982 | Pachkowski et al. | |
| 4,463,245 A | 7/1984 | McNeil | |
| 4,531,043 A | 7/1985 | Zverina et al. | |
| 4,567,346 A | 1/1986 | Marhic | |
| 4,624,765 A | 11/1986 | Cerkanowicz et al. | |
| 4,776,638 A | 10/1988 | Hahn | |
| 4,886,118 A | 12/1989 | Van Meurs et al. | |
| 5,019,268 A | 5/1991 | Rogalla | |
| 5,048,404 A | 9/1991 | Bushnell et al. | |
| 5,082,054 A | 1/1992 | Kiamanesh | |
| 5,166,950 A | 11/1992 | Jouvaud et al. | |
| 5,326,530 A | 7/1994 | Bridges | |
| 5,348,629 A | 9/1994 | Khudenko | |
| 5,368,724 A | 11/1994 | Ayers et al. | |
| 5,534,232 A | 7/1996 | Denes et al. | |
| 5,609,736 A | 3/1997 | Yamamoto | |
| 5,609,777 A | 3/1997 | Apunevich et al. | |
| 5,655,210 A | 8/1997 | Gregoire et al. | |
| 5,660,743 A | 8/1997 | Nemchinsky | |
| 5,738,170 A | 4/1998 | Lavernhe | |
| 5,746,984 A | 5/1998 | Hoard | |
| 5,766,447 A | 6/1998 | Creijghton | |
| 5,876,663 A | 3/1999 | Laroussi | |
| 5,879,555 A | 3/1999 | Khudenko | |
| 5,893,979 A | 4/1999 | Held | |
| 5,908,539 A | 6/1999 | Young et al. | |
| 5,979,551 A | 11/1999 | Uban et al. | |
| 6,007,681 A | 12/1999 | Kawamura et al. | |
| 6,117,401 A | 9/2000 | Juvan | |
| 6,225,764 B1 | 5/2001 | Shim | |
| 6,749,759 B2 | 6/2004 | Denes et al. | |
| 6,929,067 B2 | 8/2005 | Vinegar et al. | |
| 6,987,792 B2 | 1/2006 | Do et al. | |
| 7,086,468 B2 | 8/2006 | De Rouffignac et al. | |
| 7,096,953 B2 | 8/2006 | De Rouffignac et al. | |
| 7,121,342 B2 | 10/2006 | Vinegar et al. | |
| 7,128,816 B2 | 10/2006 | Denes et al. | |
| 7,536,975 B2 | 5/2009 | Denes et al. | |
| 7,857,972 B2 * | 12/2010 | Foret | 210/243 |
| 7,893,408 B2 | 2/2011 | Hieftje et al. | |
| 8,074,439 B2 * | 12/2011 | Foret | 60/203.1 |
| 2002/0148562 A1 | 10/2002 | Aoyagi et al. | |
| 2003/0024806 A1 | 2/2003 | Foret | |
| 2003/0101936 A1 | 6/2003 | Lee | |
| 2003/0179536 A1 | 9/2003 | Stevenson et al. | |
| 2003/0213604 A1 | 11/2003 | Stevenson et al. | |
| 2005/0087435 A1 | 4/2005 | Kong et al. | |
| 2005/0151455 A1 | 7/2005 | Sato et al. | |
| 2005/0155373 A1 | 7/2005 | Hirooka et al. | |
| 2006/0151445 A1 | 7/2006 | Schneider | |
| 2006/0196424 A1 | 9/2006 | Swallow et al. | |
| 2007/0240975 A1 | 10/2007 | Foret | |
| 2007/0253874 A1 | 11/2007 | Foret | |
| 2008/0202915 A1 | 8/2008 | Hieftje et al. | |
| 2011/0031224 A1 * | 2/2011 | Severance et al. | 219/121.52 |
| 2011/0225948 A1 * | 9/2011 | Valeev et al. | 60/39.821 |
| 2012/0097648 A1 | 4/2012 | Foret | |

OTHER PUBLICATIONS

Brandt, A. R., "Converting Green River oil shale to liquid fuels with Alberta Taciuk Processor: energy inputs and greenhouse gas emissions," Jun. 1, 2007, 33 pages.

Brandt, A. R., "Converting Green River oil shale to liquid fuels with the Shell in-situ conversion process: energy inputs and greenhouse gas emissions," Jun. 30, 2007, 36 pages.

International Search Report and Written Opinion for PCT/US2009/000937 dated Sep. 17, 2009, 11 pages.

International Search Report and Written Opinion for PCT/US2008/011926 dated Apr. 17, 2009, 10 pages.

Kavan, L., "Electrochemical Carbon," Chem Rev (1997), 97:3061-3082.

"Understanding in-situ combustion," www.HeavyOilinfo.com, accessed Oct. 16, 2007, 4 pages.

"Unleashing the potential: Heavy Oil," Supplement to E&P Annual Reference Guide, www.eandp.info.com, Jun. 2007, 15 pages.

International Search Report [KIPO] PCT/US201/062941 dated Jan. 27, 2014.

* cited by examiner

INDUCTIVELY COUPLED PLASMA ARC DEVICE

PRIORITY CLAIM

This patent application is a continuation-in-part patent application of U.S. patent application Ser. No. 12/370,591 filed on Feb. 12, 2009 and entitled "System, Method and Apparatus for Lean Combustion with Plasma from an Electrical Arc," which is a non-provisional patent application of U.S. provisional patent application Ser. No. 61/027,879 filed on Feb. 12, 2008 and entitled, "System, Method and Apparatus for Lean Combustion with Plasma from an Electrical Arc," both of which are hereby incorporated by reference in their entirety.

FIELD OF THE INVENTION

The present invention relates generally to plasma torches. More specifically, the present invention relates to inductively coupled plasma arc devices.

BACKGROUND OF THE INVENTION

Plasma is primarily used for cutting metal, plasma spraying, analysis of gases via IC Mass Spectrometry, plasma TVs, plasma lighting and expensive production of nanopowders. One of the major drawbacks for using plasma for other applications is the complexity and cost of existing systems. As a result, current plasma systems are not widely used for steam reforming, cracking, gasification, partial oxidation, pyrolysis, heating, melting, sintering, rich combustion and/or lean combustion.

The major unresolved issue with current commercially available plasma torches that use inertia confinement is that there is only one fluid exit—through the nozzle—for confining the plasma. Moreover, these systems must rely on controlling or regulating the upstream gas flow in order to ignite, sustain and confine the plasma. These problems have plagued the plasma industry and thus plasma torches are viewed as difficult to operate due to the power supplies, controls, gases and valves associated with the torches.

Accordingly, there is a need for a plasma system that is less complex, lower in cost and more efficient that current systems in order for plasma to be accepted as a mainstream device for use in the aforementioned applications and processes.

SUMMARY OF THE INVENTION

The present invention provides an inductively coupled plasma device that is less complex, lower in cost and more efficient that current systems in order for plasma to be accepted as a mainstream device for use in the aforementioned applications and processes. The devices described herein reduce the complexity of gas regulation (upstream and downstream fluid flow), current control, voltage control, plasma ignition, sustainment and confinement by using a moveable electrode in combination with an electrode nozzle, a tangential entry and exit, and a wave energy source selected from electromagnetic radiation ("EMR") within the radio frequency ("RF") range all the way to a line frequency of 50 or 60 Hz. As a result, the present invention opens the door for wide scale use of plasma for heavy industrial applications as well as commercial, residential and transportation applications.

When coupled to a turbocharger or turbocompressor, the present invention allows for operating an inductively coupled plasma arc torch in various modes ranging from steam reforming, cracking, gasification, partial oxidation, pyrolysis, heating, melting, sintering, rich combustion and lean combustion. With respect to lean combustion of hydrogen, the present invention first cracks a fuel to hydrogen and black carbon, and captures the black carbon. Black carbon is fine particulate carbon emitted during incomplete combustion of carbonaceous fuels that is commonly referred to as soot. Black carbon is said to be the second largest contributor to global warming after carbon dioxide emissions. Thus, reducing black carbon emissions may be the fastest strategy for slowing climate change. In addition, the present invention even allows for combining water treatment and/or fluid treatment with anyone of the aforementioned applications.

The present invention provides an inductively coupled plasma device with a cylindrical vessel having a first end and a second end, wherein at least a portion of the cylindrical vessel is transparent or semi-transparent to a wave energy. A tangential inlet is connected to or proximate to the first end. A tangential outlet is connected to or proximate to the second end. An electrode housing is connected to the first end of the cylindrical vessel such that a first electrode is (a) aligned with a longitudinal axis of the cylindrical vessel, and (b) extends into the cylindrical vessel. A hollow electrode nozzle is connected to the second end of the cylindrical vessel such that the center line of the hollow electrode nozzle is aligned with the longitudinal axis of the cylindrical vessel. An electromagnetic radiation source that produces a wave energy and is disposed around or within the cylindrical vessel.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 9 is a diagram of a RF inductively coupled plasma arc torch in accordance with one embodiment of the present invention;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
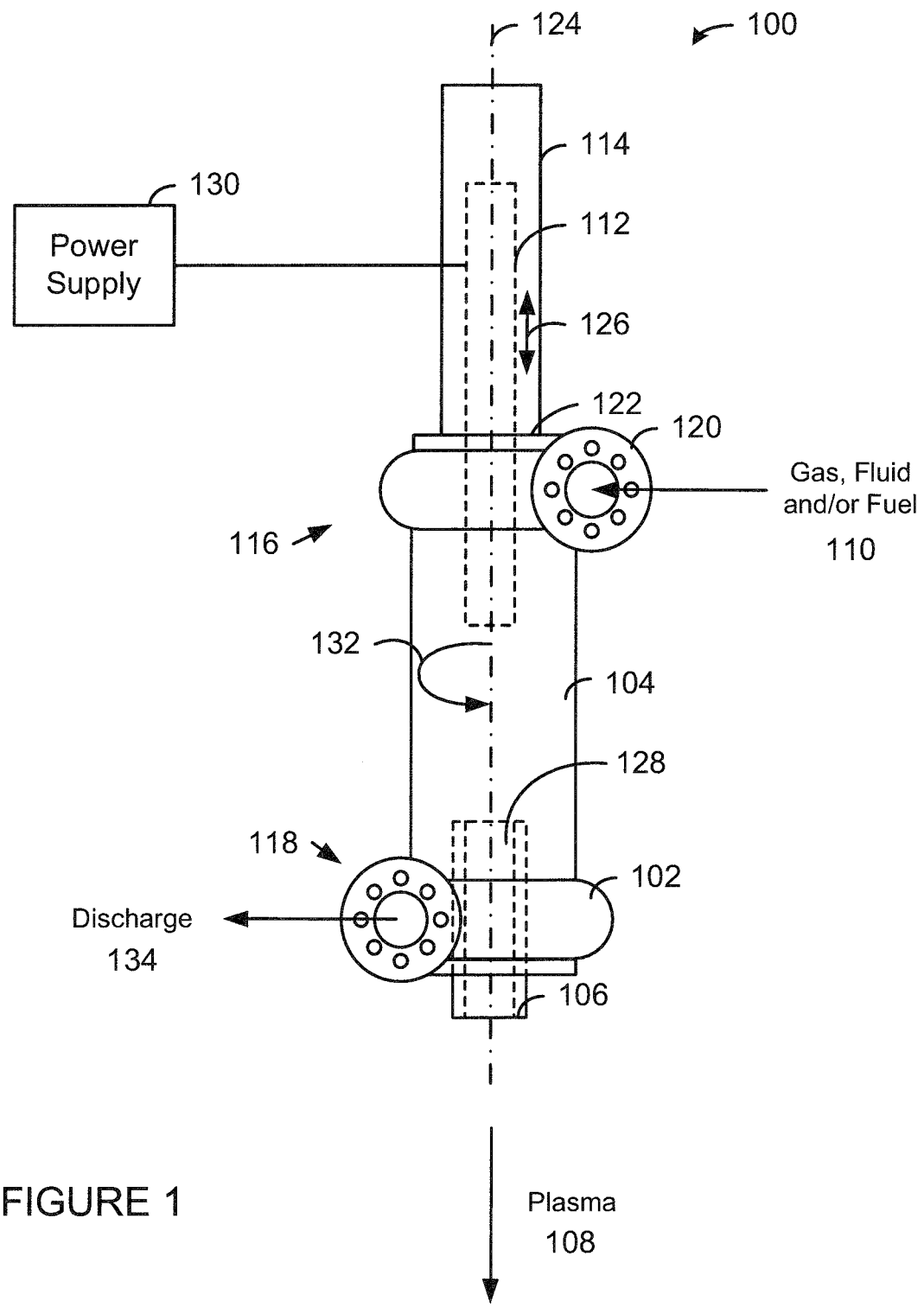
FIG. 1 is a diagram of a plasma arc torch in accordance with one embodiment of the present invention.

Now referring to FIG. 1, a plasma arc torch 100 in accordance with one embodiment of the present invention is shown. The plasma arc torch 100 is a modified version of the ARCWHIRL® device disclosed in U.S. Pat. No. 7,422,695 (which is hereby incorporated by reference in its entirety) that produces unexpected results. More specifically, by attaching a discharge volute 102 to the bottom of the vessel 104, closing off the vortex finder, replacing the bottom electrode with a hollow electrode nozzle 106, an electrical arc can be maintained while discharging plasma 108 through the hollow electrode nozzle 106 regardless of how much gas (e.g., air), fluid (e.g., water) or steam 110 is injected into plasma arc torch 100. In addition, when a valve (not shown) is connected to the discharge volute 102, the mass flow of plasma 108 discharged from the hollow electrode nozzle 106 can be controlled by throttling the valve (not shown) while adjusting the position of the first electrode 112 using the linear actuator 114.

As a result, plasma arc torch 100 includes a cylindrical vessel 104 having a first end 116 and a second end 118. A tangential inlet 120 is connected to or proximate to the first end 116 and a tangential outlet 102 (discharge volute) is connected to or proximate to the second end 118. An electrode housing 122 is connected to the first end 116 of the cylindrical vessel 104 such that a first electrode 112 is aligned with the longitudinal axis 124 of the cylindrical vessel 104, extends into the cylindrical vessel 104, and can be moved along the longitudinal axis 124. Moreover, a linear actuator 114 is connected to the first electrode 112 to adjust the position of the first electrode 112 within the cylindrical vessel 104 along the longitudinal axis of the cylindrical vessel 124 as indicated by arrows 126. The hollow electrode nozzle 106 is connected to the second end 118 of the cylindrical vessel 104 such that the center line of the hollow electrode nozzle 106 is aligned with the longitudinal axis 124 of the cylindrical vessel 104. The shape of the hollow portion 128 of the hollow electrode nozzle 106 can be cylindrical or conical. Moreover, the hollow electrode nozzle 106 can extend to the second end 118 of the cylindrical vessel 104 or extend into the cylindrical vessel 104 as shown. As shown in FIG. 1, the tangential inlet 120 is volute attached to the first end 116 of the cylindrical vessel 104, the tangential outlet 102 is a volute attached to the second end 118 of the cylindrical vessel 104, the electrode housing 122 is connected to the inlet volute 120, and the hollow electrode nozzle 106 (cylindrical configuration) is connected to the discharge volute 102. Note that the plasma arc torch 100 is not shown to scale.

A power supply 130 is electrically connected to the plasma arc torch 100 such that the first electrode 112 serves as the cathode and the hollow electrode nozzle 106 serves as the anode. The voltage, power and type of the power supply 130 is dependant upon the size, configuration and function of the plasma arc torch 100. A gas (e.g., air), fluid (e.g., water) or steam 110 is introduced into the tangential inlet 120 to form a vortex 132 within the cylindrical vessel 104 and exit through the tangential outlet 102 as discharge 134. The vortex 132 confines the plasma 108 within in the vessel 104 by the inertia (inertial confinement as opposed to magnetic confinement) caused by the angular momentum of the vortex, whirling, cyclonic or swirling flow of the gas (e.g., air), fluid (e.g., water) or steam 110 around the interior of the cylindrical vessel 104. During startup, the linear actuator 114 moves the first electrode 112 into contact with the hollow electrode nozzle 106 and then draws the first electrode 112 back to create an electrical arc which forms the plasma 108 that is discharged through the hollow electrode nozzle 106. During operation, the linear actuator 114 can adjust the position of the first electrode 112 to change the plasma 108 discharge or account for extended use of the first electrode 112.

Figure 2:
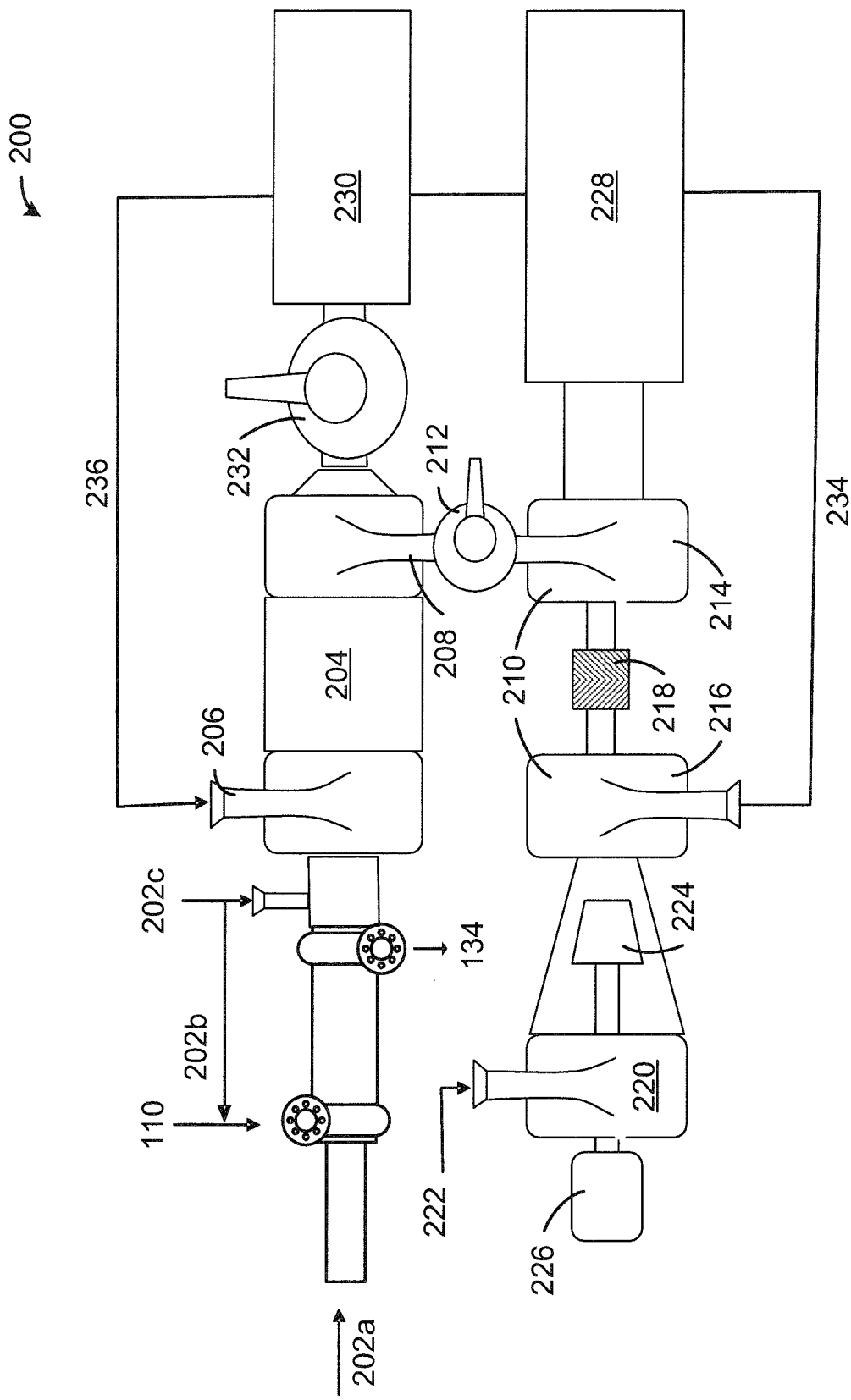
FIG. 2 is a diagram of a Supersonic Lean Combustion Plasma Turbine in accordance with one embodiment of the present invention.

Referring now to FIG. 2, a diagram of a Supersonic Lean Combustion Plasma Turbine 200 in accordance with one embodiment of the present invention is shown. In order to gasify, crack, reform or pyrolyize fuel, the fuel 202 may be introduced into the system at one or more points: (a) introducing the fuel 202a into the plasma 108 directly through first electrode 112 wherein the first electrode 112 is hollow; (b) mixing (e.g., via an eductor) the fuel 202b with the gas (e.g., air), fluid (e.g., water) or steam 110 introduced into the tangential inlet 120 of the plasma arc torch 100; and (c) introducing (e.g., via an eductor) the fuel 202c into the plasma 108 plume exiting the hollow electrode nozzle 106. The plasma arch torch 100 is connected to a cyclone combustor 204 with a tangential entry 206 and tangential exit 208. The cyclone combustor 204 is connected to a turbocharger 210 via valve 212. Hot gases enter into a turbine 214 of the turbocharger 210. The turbine 214 rotates a compressor 216 by means of a shaft with a pinion 218. A compressor inlet valve 220 is connected to the compressor 216. Compressor inlet valve 220 eliminates the need for stators to impart a whirl flow to match the compressor wheel rotation direction. In addition, by utilizing a tapered reducer for the housing the velocity of the air 222 must increase in order to conserve angular momentum. By utilizing a plunger style stopper valve assembly 224 coupled to a linear actuator 226, the mass flow can be pinched or reduced while maintaining velocity. The physical separation of the compressor/turbine or turbocharger 210 from the combustor 204 allows for a radically different design for gas turbines, power plants and airframes. The turbocharger 210 can be located and oriented to maximize airflow while minimizing foreign object damage (FOD). In addition, the turbocharger 210 may be coupled to rotating unions and tubing in order to rotate or direct the exhaust from the turbine 214 for thrust vectoring. In order to maximize efficiency a first stage recuperator 228 is placed on the discharge exhaust from the turbine 214 and a second stage recuperator 230 is place on the discharge exhaust from the combustor 204 via a valve 232. Compressed air 234 enters into the first stage recuperator 228 and then into the second stage recuperator 230. The hot compressed air 236 then enters into the combustor 204 via a volute with tangential entry 206.

More specifically, the compressor inlet valve 220 includes a volute with a tangential entry, a cone-shaped reducer connected to the volute, a linear actuator connected to the volute, and a cone-shaped stopper disposed within the cone-shaped reducer and operably connected to the linear actuator. A controller is connected to the linear actuator to adjust a gap between the cone-shaped stopper and the cone-shaped reducer to increase or decrease mass flow while maintaining whirl velocity to closely match compressor tip velocity.

Although there are several variations and modes of operations a few brief examples will be given in order to quickly demonstrate the uniqueness as well as functionality of the Supersonic Lean Combustion Plasma Turbine 200. A vortex is formed within the plasma arc torch 100 using water, steam, fuel or any other fluid 110. The arc is struck and a plasma is discharged into the eye of the cyclone combustor 204. The plasma syngas plume entering into the cyclone combustor 204 is also the igniter. Since it is in the eye of the cyclone it will be extended along the longitudinal axis of the combustor 204 and into valve 232. By throttling valves 212 and 232 the turbine can be operated from a takeoff mode and transition to supersonic and hypersonic flight. The purpose of the pinion 218 on the turbocharger 210 in combination with separating the combustor 204 from the compressor 216 and turbine 214 allows for a unique and completely unobvious mode of operation.

Figure 3:
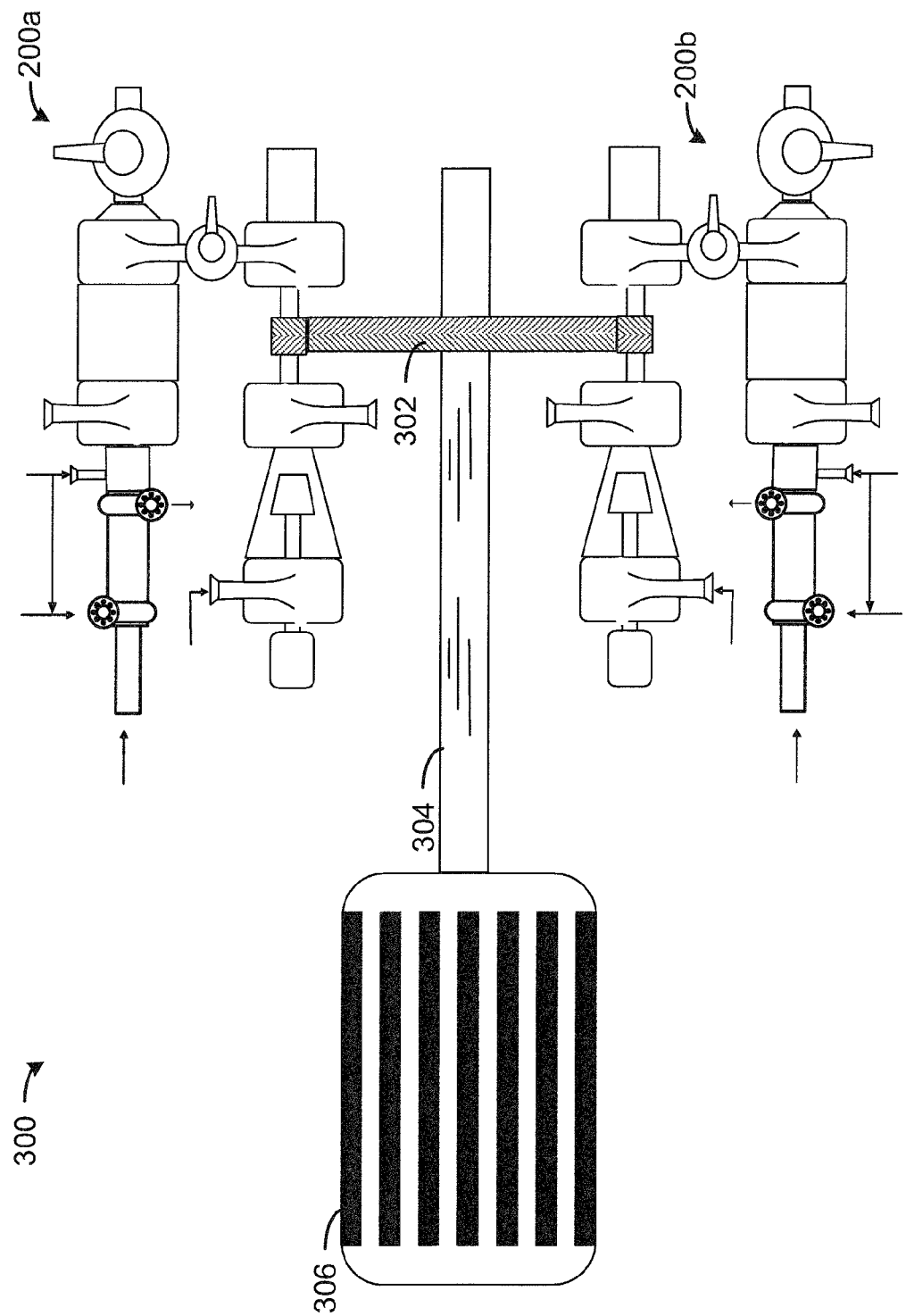
FIG. 3 is a diagram of a Supersonic Lean Combustion Plasma Turbine Motor Generator in accordance with another embodiment of the present invention.

Referring now to FIG. 3, a diagram of a Supersonic Lean Combustion Plasma Turbine Motor Generator 300 in accordance with another embodiment of the present invention is shown. Two or more Plasma Turbines 200 (200a and 200b as shown) are coupled to a bull gear 302 in a locked-train fashion. The bull gear 302 drives a motor generator 306 via drive shaft 304. This configuration allows for operating in a very fuel efficient and cost effective means. The first Plasma Turbine 200a is started by using the motor to rotate the pinions in order to rotate the compressor. The cyclone valve's stopper is opened to allow air into the compressor. The second Plasma Turbine's 200b stopper is placed in a closed position in order to unload the compressor. This can also be accomplished by placing electrical clutches on the pinion. When air flow enters into the combustor, the plasma arc torch 100 is ignited with only water or steam flowing through it in the same rotational direction as the cyclone combustor. Once the plasma arc is stabilized fuel is flowed into the plasma arc torch 100 and gasified and synthesized into hydrogen and carbon monoxide. The hot syngas plasma flows into the cyclone combustor. It is ignited and lean combusted and flowed out of the combustor via the tangential exit. Valve is fully opened while valve is shut in order to maximize flow into the turbine. Valves and are then adjusted according to torque loading on the pinion in addition to turbine and compressor speed.

By operating only one combustor at its maximum efficiency the generator can be operated as a spinning reserve. All utility companies within the US are required to maintain "Spinning Reserves." In order to come up to full power additional Plasma Turbines can be started almost instantly with very little lag time. This annular Plasma Turbine configuration may have multiple bull gears on a single shaft with each bull gear consisting of multiple Plasma Turbines.

Figure 4:
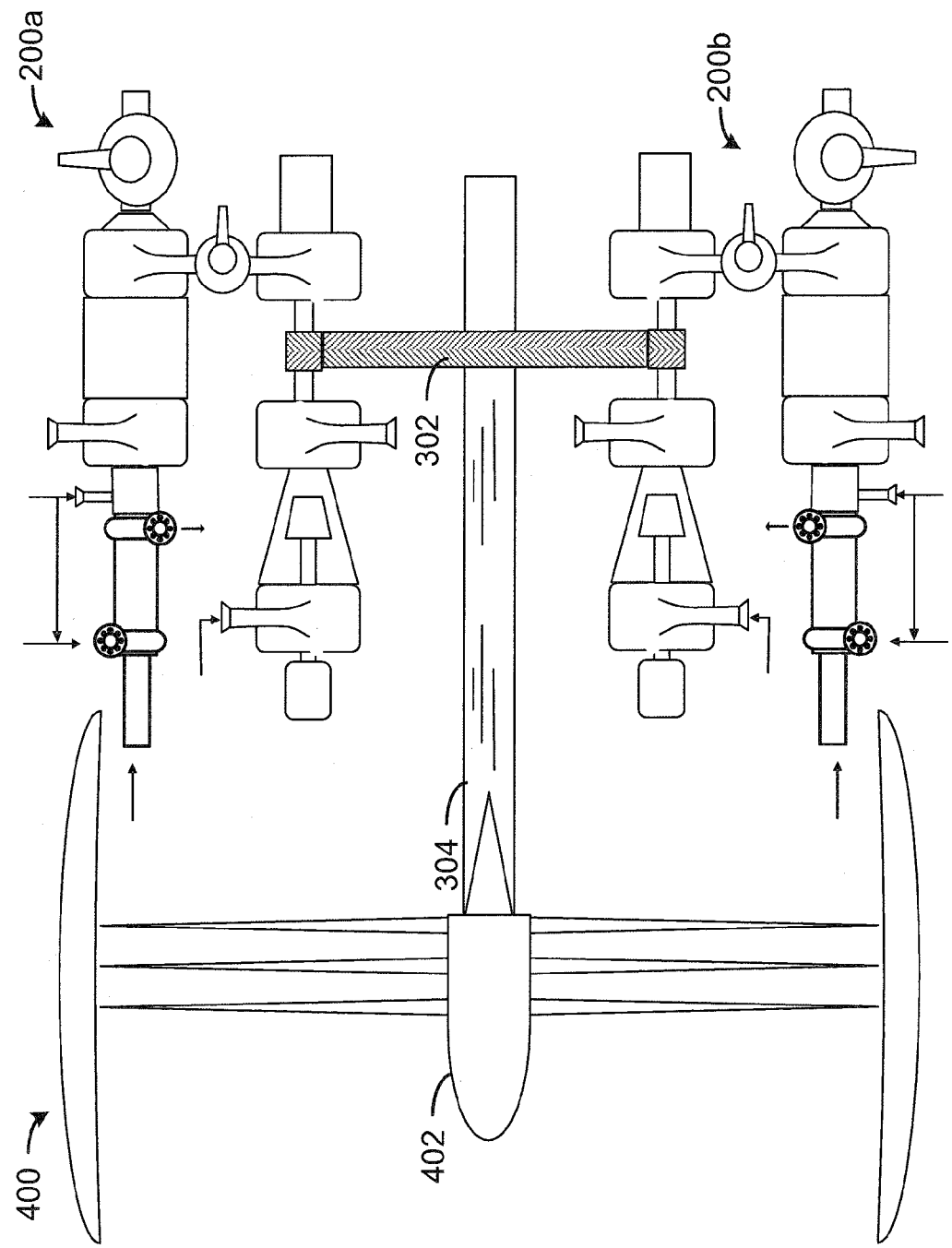
FIG. 4 is a diagram of a Supersonic Lean Combustion Plasma Turbine High Bypass Fan in accordance with another embodiment of the present invention.

Now referring to FIG. 4, a diagram of a Supersonic Lean Combustion Plasma Turbine High Bypass Fan 400 in accordance with another embodiment of the present invention is shown. Two or more Plasma Turbines 200 (200a and 200b as shown) are coupled to a bull gear 302 in a locked-train fashion. A high bypass fan 402 is attached to the shaft 304. Likewise, a small motor generator may be attached to the opposite end of the shaft for starting and inflight electrical needs. Once again the Plasma Turbine configuration allows for maximizing fuel efficiency while idling at the gate and taxing by operating only one Plasma Turbine attached to the bull gear. Prior to takeoff all Plasma Turbines are brought online to maximize thrust. After takeoff Plasma Turbines may be taken offline to maximize fuel efficiency during climbout and at cruise altitude and speed.

When the pilot is ready to transition to supersonic flight the turbine inlet valve is slowly closed while the combustor valve is opened. The high bypass fan may be feathered in order to reduce speed of the bull gear or to reduce drag. Likewise an inlet cowling may be used to close air flow to the high bypass fan. Air flow into the combustor is directly due to speed of the aircraft. This is accomplished with an additional three way valve (not shown) connected to the combustor tangential entry. Thus, the combination of the plasma arc torch 100 and the cyclone combustor coupled to a unique exhaust valve allows for a true plasma turbine scramjet that can be operated in a supersonic lean fuel combustion mode.

Figure 5:
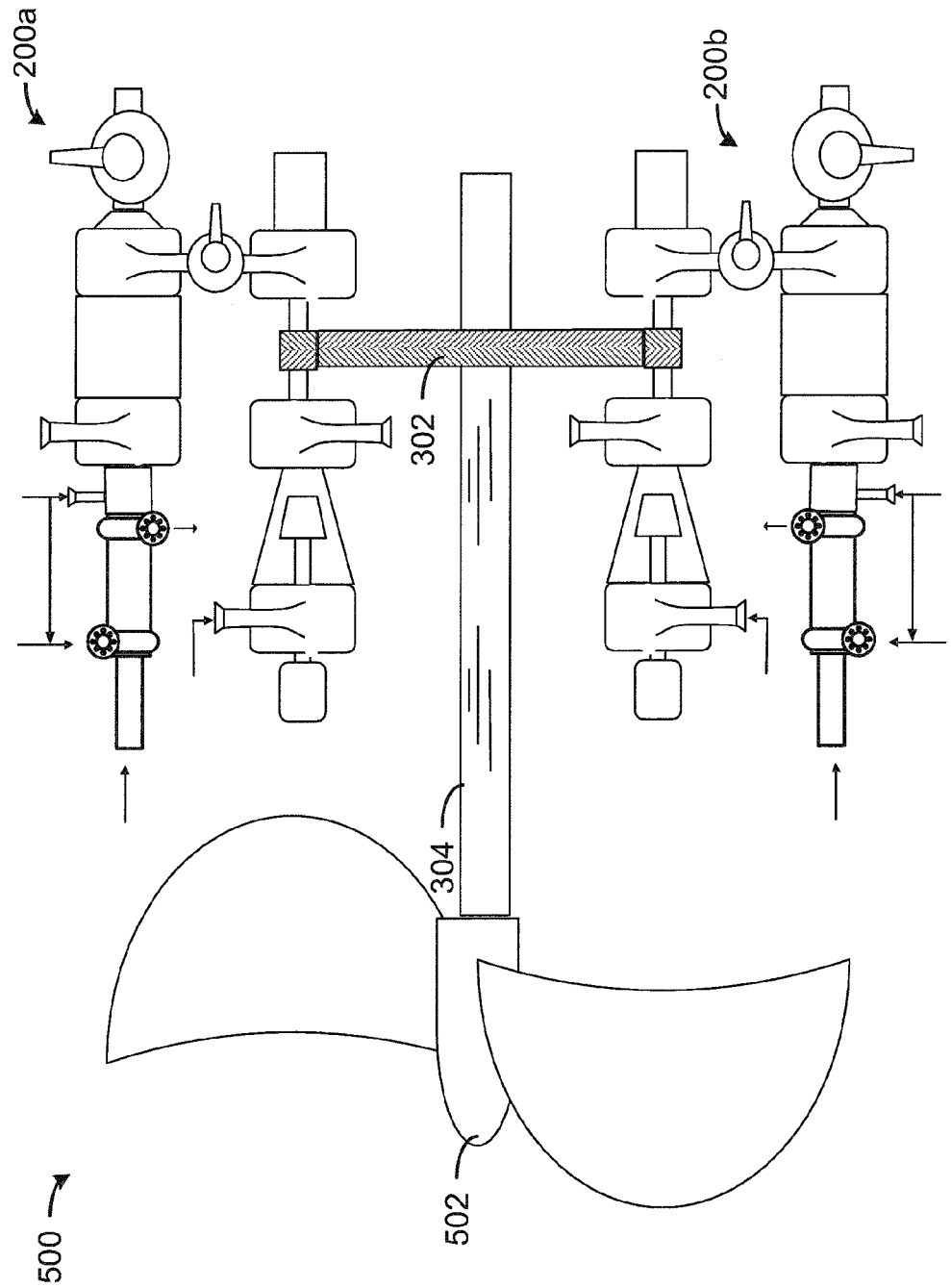
FIG. 5 is a diagram of a Supersonic Lean Combustion Plasma Turbine Propeller in accordance with another embodiment of the present invention.

Referring to FIG. 5, a diagram of a Supersonic Lean Combustion Plasma Turbine Propeller in accordance with another embodiment of the present invention is shown, which is similar to the motor generator and high bypass fan, the system allows for a very unique marine turbine. In comparison, the US Navy's Spruance class destroyers were one of the first class of Naval ships to utilize high powered marinized aircraft turbines. Two GE LM-2500 Gas Turbine Engines were coupled to the port shaft via a bull gear and two GE LM-2500 Gas Turbine Engines were coupled to the starboard shaft via a bull gear. This gave the ship a total of 100,000 shaft horsepower. In order to operate in the most fuel efficient mode, only one engine was operated while the other engine was decoupled from the bull gear via a friction and spur gear type clutch. The other shaft was placed in a trail mode position and allowed to spin or rotate freely. If full power was needed the other 3 gas turbine engines required about 3 minutes to start in an emergency mode.

There were two major problems associated with the LM-2500 coupled to a bull gear. First, when starting from a dead in the water position, the engineers had to conduct a dead shaft pickup. This required engaging the clutch and placing the friction brake on which held the power turbine. The turbine was started and hot gases flowed across a non-moving power turbine section. The brake was released and the power turbine rotated thus turning the bull gear. The variable pitched propeller was usually placed at zero pitch.

Returning back to FIG. 5, the bull gear 302 with multiple Plasma Turbines 200 (200a and 200b are shown) may be attached to a drive shaft 304 that is connected to a propeller 502. However, this system can be greatly augmented with a motor generator (not shown) directly attached to the drive shaft 304. In fact, the propeller 502 can be eliminated and replaced with an all electric drive pod. Thus, FIG. 3 would be installed and simply would provide electrical power to the electric drive pod. Neither rotating a shaft for transportation and propulsion purposes nor rotating a large motor generator may be required from the Plasma Turbine System.

Figure 6:
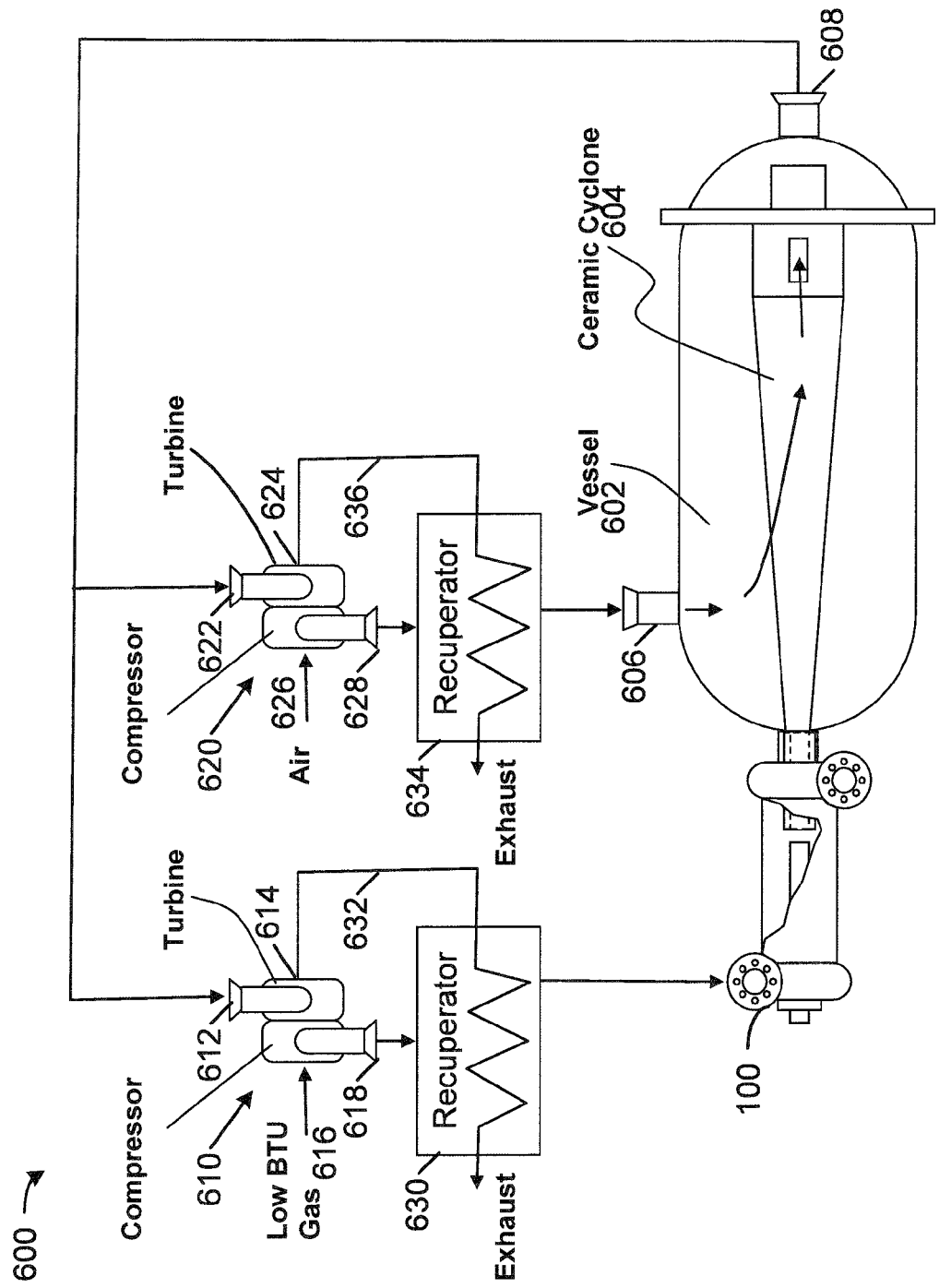
FIG. 6 is a diagram of a Plasma Turbine Thermal Oxidizer in accordance with another embodiment of the present invention.

Now referring to FIG. 6, a diagram of Plasma Turbine Thermal Oxidizer 600 in accordance with another embodiment of the present invention is shown. The plasma arc torch 100 is attached to a commonly available filter vessel 602 which houses a ceramic hydrocylone 604. Ceramic hydrocyclones 604 are available from CoorsTek and Natco.

More specifically, the vessel 602 has an air intake 606, a discharge exhaust 608 and houses at least one ceramic cyclone combustor 604 connected to the hollow electrode nozzle of the plasma arc torch 100. A first turbocharger 610 has a first turbine entry 612, a first turbine exit 614, a first compressor entry 616 and a first compressor exit 618. A second turbocharger 602 has a second turbine entry 622, a second turbine exit 624, a second compressor entry 626 and a second compressor exit 628. The first turbine entry 612 and the second turbine entry 622 are connected to the discharge exhaust 608 of the vessel 602. A first recuperator 630 is connected to the first turbine exit 614, the first compressor exit 618 and the tangential input of the plasma arc torch 100 such that a compressed fuel from the first compressor exit 618 is heated by a first exhaust 632 from the first turbine exit 614 and enters the tangential input of the plasma arc torch 100. A second recuperator 634 connected to the second turbine exit 624, the second compressor exit 628 and the air intake 606 of the vessel 602 such that a compressed air from the second compressor exit 628 is heated by a second exhaust 636 from the second turbine exit 624 and enters the air intake 606 of the vessel 602.

Many landfills as well as wastewater treatment plants produce a low BTU fuel referred to as biogas. Likewise, many industries produce a very low BTU offgas that must be thermally oxidized or incinerated. The plasma turbine thermal oxidizer achieves lean combustion by first gasifying the low BTU fuel in another low BTU fuel—syngas. However, since the syngas has a larger ignition range (LEL to UEL) it can be combusted at high flow rates without additional fuel.

The system is operated in the following mode. The plasma arc torch 100 is turned on to establish an arc. Water or steam may be flowed in the plasma arc torch 100 to form the whirl or vortex flow. Air is flowed into a compressor through a recuperator and into the vessel. The air surrounds and cools the ceramic cyclone combustor. The air enters into the ceramic hydrocyclone tangentially then exits as a hot gas into the turbines. Once air flow is established the low BTU gas is flowed into a compressor then into a recuperator. The hot low BTU gas is flowed into the plasma arc torch 100 where it is steam reformed into syngas. Once again, the syngas plasma enters into apex valve of the ceramic cyclone combustor. The syngas is lean combusted and traverses to the turbine, recuperator and then exhausted for additional uses. In this system, the turbochargers may be installed with high speed alternators for providing electricity to operate the power supplies for the plasma arc torch 100.

This system is especially useful at wastewater treatment plants ("WWTPs"). Biogas is often produced from digesters. Likewise, all WWTPs use air to aerate wastewater. Since the Plasma Turbine Thermal Oxidizer operates in a lean fuel combustion mode, there is ample oxygen left within the exhaust gas. This gas can be used for aerating wastewater. Likewise, plasma arc torch 100 can be used to disinfect water while steam reforming biogas. In addition, biosolids can be gasified with the plasma arc torch 100 to eliminate disposal problems and costs.

Figure 7:
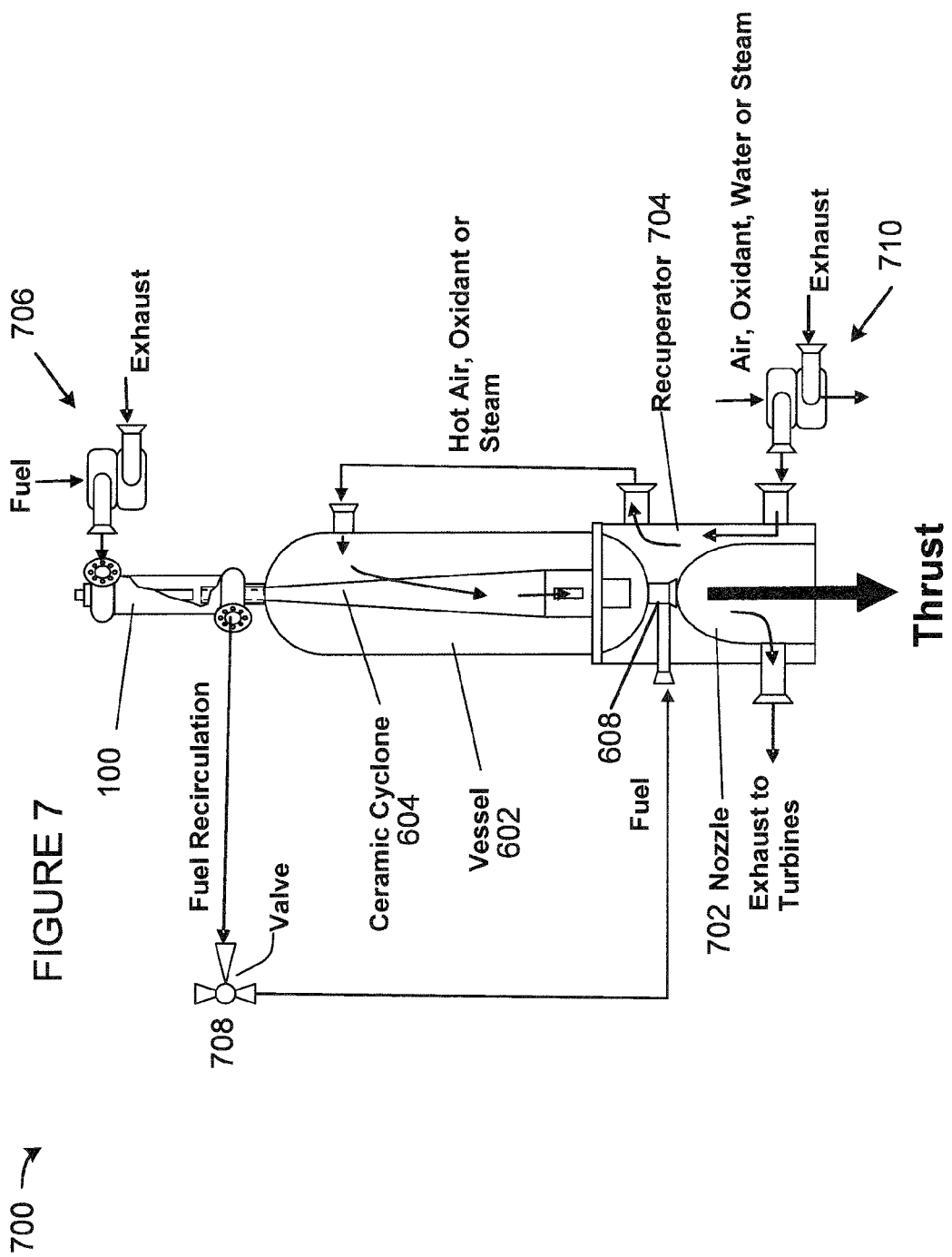
FIG. 7 is a diagram of a Plasma Turbine Air Breathing & Steam Rocket with Recuperator in accordance with another embodiment of the present invention.

Referring now to FIG. 7, a diagram of a Plasma Turbine Air Breathing & Steam Rocket with Recuperator 700 in accordance with another embodiment of the present invention is shown. The thermal oxidizer 600 of FIG. 6 can easily be converted into a rocket or process heater. A nozzle 702 and recuperator 704 are attached to the outlet 608 of the combustor 604. Air or an oxidant are flowed into the recuperator 704. The hot air or oxidant exits the recuperator 704 and enters into the vessel 602 and into the ceramic cyclone combustor 604. Fuel is pressurized via a turbocompressor 706 and enters into the plasma arc torch 100 where it is converted or cracked into syngas. The syngas plasma plume ejecting into the ceramic cyclone combustor 604 is controlled via a multi-position fuel recirculation valve 708. A portion of the fuel may flow into the nozzle 702 to increase thrust. In order to drive the turbines a portion of the hot exhaust gas is scavenged and flowed to the inlets of the fuel turbocompressor 706 and turbocharger 710. When used as an air breathing rocket, upon reaching altitudes where lean combustion cannot be sustained due a lack of oxygen molecules, in lieu of carrying an oxidant, the rocket would carry water. The water in pumped into the recuperator 704 to generate steam. The turbocharger 710 is valved such that it can pull a vacuum on the recuperator 704. The turbocharger 710 is then operated as a vapor compressor. The compressed steam is flowed in the vessel 602. The extremely hot syngas reacts with the steam in the ceramic cyclone combustor 604 for conversion to hydrogen and carbon dioxide via the water gas shift reaction. Since the water gas shift reaction is exothermic this will ensure that the steam remains in the vapor state. A small amount of liquid oxidizer may be added to combust the hydrogen.

The present invention provides a method for supersonic lean fuel combustion by creating an electric arc, generating a whirl flow to confine a plasma from the electric arc, generating a combustion air whirl flow, extracting a rotational energy from one or more hot gases, recuperating energy from the hot gases, and utilizing the electrical arc for converting fuel to syngas while confining the plasma to the vortex of the whirling combustion air in order to maintain and hold a flame for supersonic combustion while coupled to a means for extracting rotational energy from the hot lean combustion exhaust gas while recuperating energy for preheating the fuel and combustion air.

Figure 8:
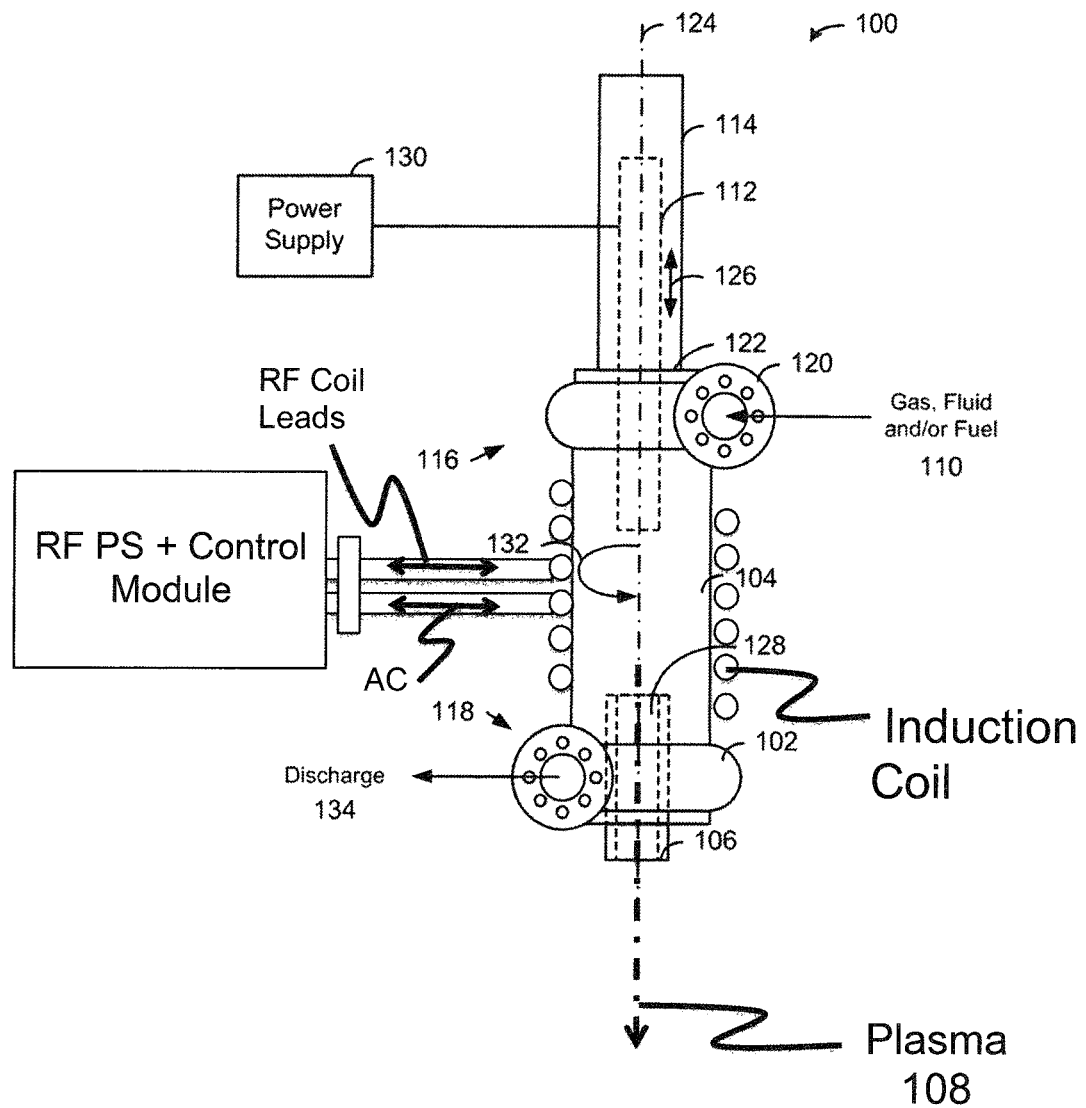
FIG. 8 is a diagram of a RF inductively coupled plasma arc torch in accordance with one embodiment of the present invention.

Now referring to FIG. 8, an inductively coupled ("IC") plasma arc torch is illustrated in another embodiment of the present invention. Inductively coupled plasma torches are well known and well understood. Further elaboration is not necessary in order to understand and operate the present invention. However, a brief introduction to induction heating will help to understand the problems associated with current designs of IC plasma torches. Ameritherm, Inc. located in Scottsville, N.Y., explains induction heating as:

"Induction heating is a method of providing fast, consistent heat for manufacturing applications which involve bonding or changing the properties of metals or other electrically-conductive materials. The process relies on induced electrical currents within the material to produce heat.

Typical Induction Heating System

An RF power supply sets alternating current within the coil, creating a magnetic field. Your workpiece is placed in the coil where this field induces eddy currents in the workpiece, generating precise, clean, non-contact heat in the workpiece.

Operating Frequency
The higher the frequency, the shallower the heating in the workpiece.
Magnetic Vs. Non-Magnetic Materials
Due to hysteresis, magnetic materials are heated more readily than non-magnetic, resisting the alternating magnetic field within the induction coil.
Depth of Penetration
Induced current in the workpiece is most intense on the surface, diminishing below the surface; 80% of the heat produced in the part is produced in the outer 'skin'.
Coupling Efficiency
The relationship of the current flow in the workpiece and the distance between the workpiece and the coil is key; 'close' coupling increases the flow of current, increasing the amount of heat produced in the workpiece.
The Importance of Coil Design
The size and shape of the water-cooled copper coil must follow the shape of your workpiece and the variables of your process. The correct heat pattern maximizes the efficiency of heating.
Applied Power
System output determines the relative speed at which the workpiece is heated (a 5 kW system heating a workpiece more quickly than a 3 kW system)."

Now returning back to FIG. 8, an induction coil is wrapped around an RF permeable vessel 104 to ensure that the RF field generated from the induction coil can couple to either the electrically conductive cathode 112 and/or the electrically conductive anode nozzle 106 of the plasma arc torch 100. Hence, since the plasma arc torch 100 produces an electrical arc and subsequently plasma is formed near the arc, then the RF energy will couple to and enhance the plasma volume by first coupling to the free electrons within the arc. This allows for utilizing a much smaller DC power supply, for example a 12 volt battery and alternator in order to start an arc and ignite the plasma. Hence the DC power supply and arc are now operated as a plasma igniter. Thus, the RF energy is used to sustain the plasma while inertia from the whirling fluid confines the plasma. In addition, as previously disclosed, the vessel 104 has a tangential entry 110 and tangential discharge 118. The tangential discharge 118 via volute is crucial because it allows for throttling during operation to adjust plasma flow through the anode nozzle 106.

It will be understood that the vessel 104 may be constructed of an electrical conductor such as graphite, silicon carbide ("SiC"), tungsten carbide, tantalum or any high temperature electrically conductive material. Previous testing conducted by the inventor of the present invention showed that a SiC vessel could be heated to over 4,000° F. Consequently, since SiC is a very good infrared emitter, then EMR can be transmitted into the vessel by inductively heating the vessel with RF energy.

One unique, novel and completely unexpected feature is that the present invention operates similar to a diode and very similar to an electron gun. The DC power supply 130 sets up a potential difference between the cathode 112 and anode nozzle 106. Not being bound by theory, it is believed that a lower voltage DC power supply can be used, such as a vehicle alternator or battery, while maintaining a fairly large gap between the cathode 112 and anode 106. This is due to two phenomenon. First, if the cathode is heated with the induction coil, this will lead to thermionic emission. Second, it is well known that RF energy will couple to electrons. Hence, that is the method for plasma ignition within a standard IC plasma torch—provide a spark. Thus when the RF energy couples to the electron, the electron will gain energy. Consequently, this energy will be released when the electron strikes the anode. The anode will operate at a higher temperature, thus enhancing the plasma also.

If electrons need to be pumped or further energized, then the RF coil can be wrapped around the plasma 108 exiting from the anode nozzle 106 as disclosed in FIG. 9. In all tests with the plasma arc torch 100, when the discharge 134 was blocked or closed with a valve (not shown), the arc was blown out of the anode nozzle 106, then curled back around and attached to the anode nozzle 106. This phenomenon can be clearly observed when wearing a number 11 or higher welder's shield.

Figure 9A:
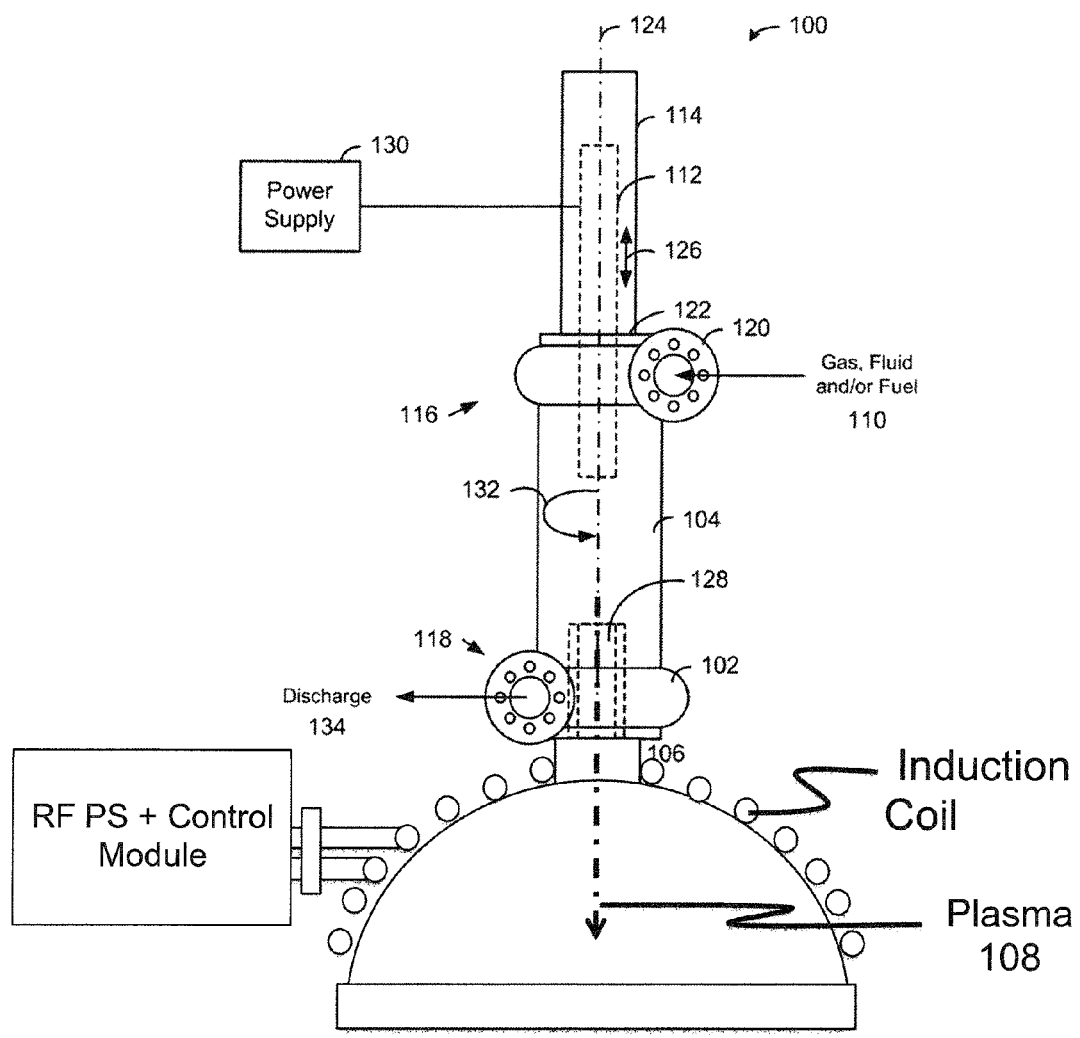
FIG. 9A is a diagram of a RF inductively coupled plasma arc torch in accordance with one embodiment of the present invention.

Referring now to FIG. 9A, a diagram of a RF inductively coupled plasma arc torch in accordance with one embodiment of the present invention, shows a RF coil wrapped partially around the anode nozzle 106. This allows for RF coupling to the anode, free electrons exiting from the anode nozzle 106 and the plasma 108. It will be understood that several induction coils and RF power supplies can be placed downstream from the anode nozzle to increase total power of the system.

Now referring FIG. 9A, a diagram of a RF inductively coupled plasma arc torch in accordance with one embodiment of the present invention is shown. The induction coil is placed around an RF permeable parabolic reflector such as alumina. It is well known and well understood that alumina reflects EMR within the infrared frequency range. Consequently, the plasma 108 is enhanced with RF energy which in turn produces more more EMR energy preferably in the UV, Visible and IR frequency range. The EMR energy is reflected downstream from the plasma 108 with the parabolic reflector thus enhancing the treatment of material.

Figure 9B:
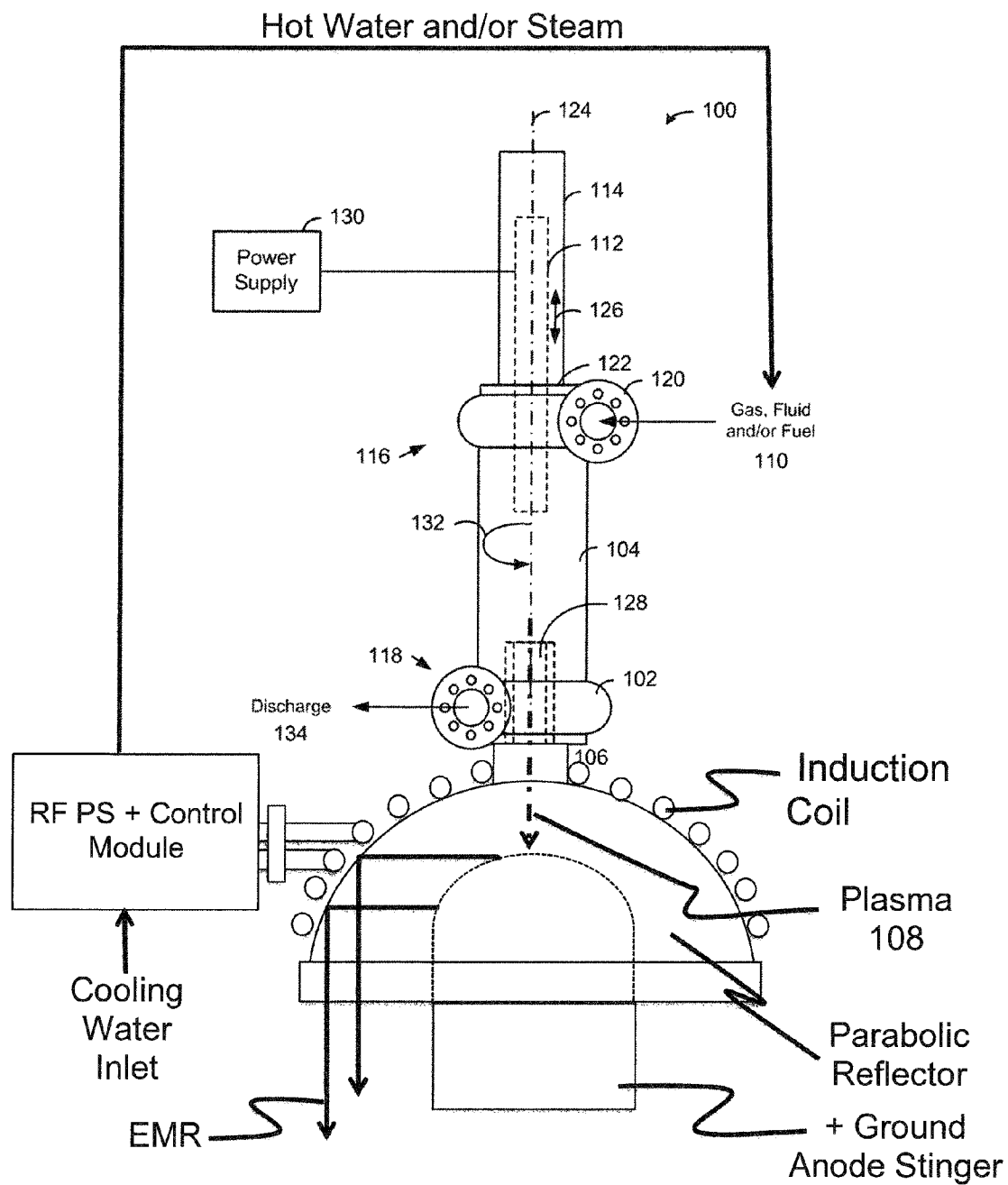
FIG. 9B is a diagram of a RF inductively coupled plasma arc torch in accordance with one embodiment of the present invention.

Referring now to FIG. 9B, a diagram of a RF inductively coupled plasma arc torch in accordance with one embodiment of the present invention is shown. A ground stinger electrode is used to transfer the arc from the cathode 112 to the anode nozzle 106 and then to the ground stinger electrode. RF energy from the induction coil may couple to the plasma, to the arc and/or to the ground electrode based upon operating frequency chosen for the desired application. Thus, the plasma arc torch 100 is the ignition source, while the RF energy is used to sustain the plasma. Hence, by using a ground stinger electrode this helps to confine the plasma near the electrodes and away from alumina reflector. By embedding the induction coil (not shown) within the alumina, this allows for cooling the alumina reflector. The hot water exiting from the alumina reflector may be used as the plasma gas. Thus, this allows for recuperating heat from hot water produced from the alumina reflector/recuperator. The hotwater and/or steam mixture is flowed into the plasma arc torch and is used as the gas/fluid 110 for the plasma arc torch 100.

Now returning back to FIGS. 6 and 7, both devices illustrate a vessel with a parabolic end shape. It will be understood that an induction coil may be attached to the plasma arc thermal oxidizer of FIG. 6 and/or the parabolic recuperator as shown in FIG. 7's plasma turbine air breathing and steam rocket.

Figure 10:
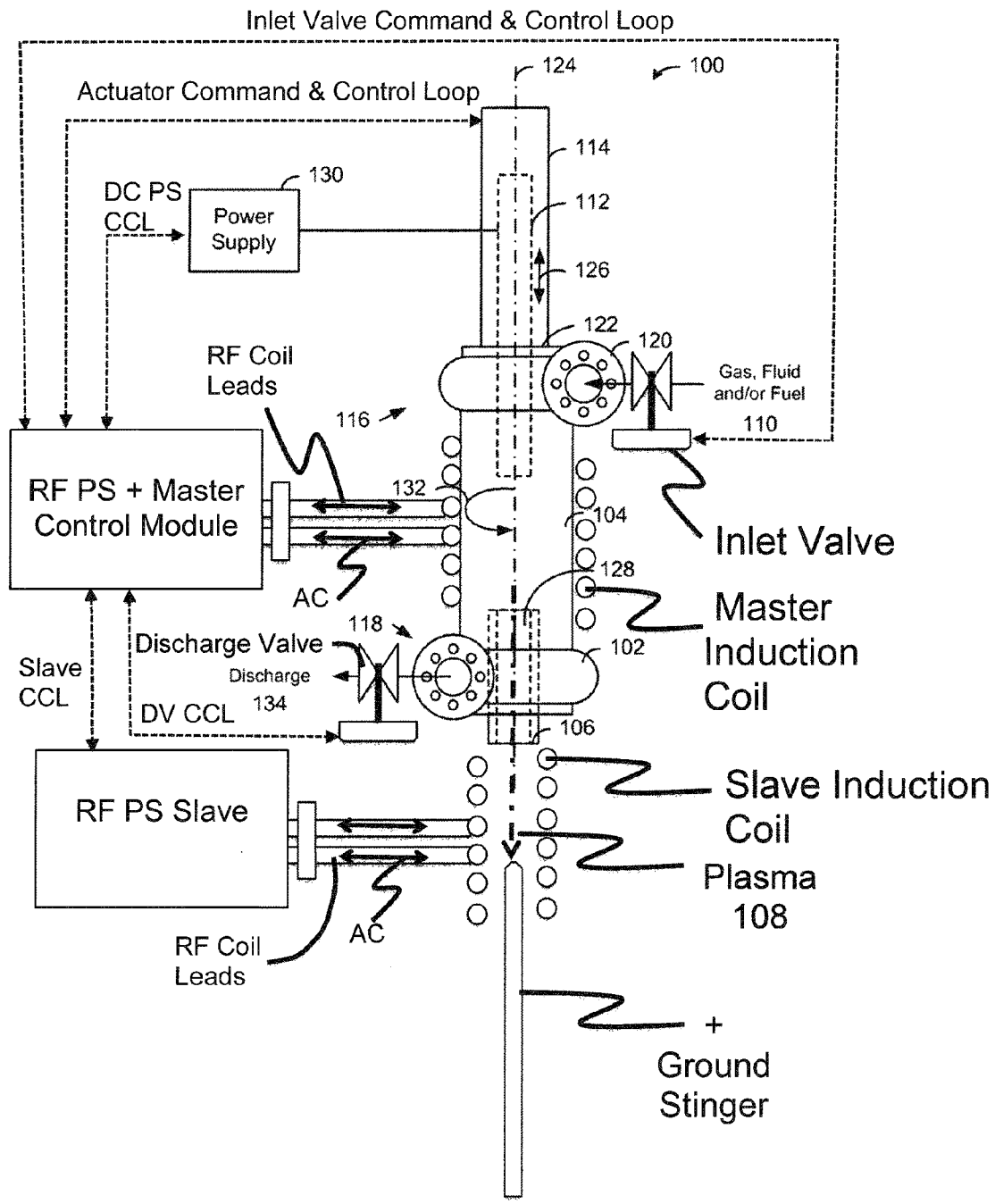
FIG. 10 is a diagram of a master and slave RF inductively coupled plasma arc torch in accordance with one embodiment of the present invention.

Turning now to FIG. 10, a diagram of a master and slave RF inductively coupled plasma arc torch in accordance with one embodiment of the present invention is shown in which RF power supplies are stacked to increase total power rating of the system. The induction coils may operate at the same frequency or at different frequencies based upon the coupling material—electrode, plasma or free electrons. Consequently, this allows for maximizing energy into the system by increasing coupling efficiency. The system includes control loops as shown in order to control an inlet valve, an outlet valve, the linear actuator, the DC power supply 130, the RF Power Supply Master Control Module and the RF Power Supply Slave.

Figure 11:
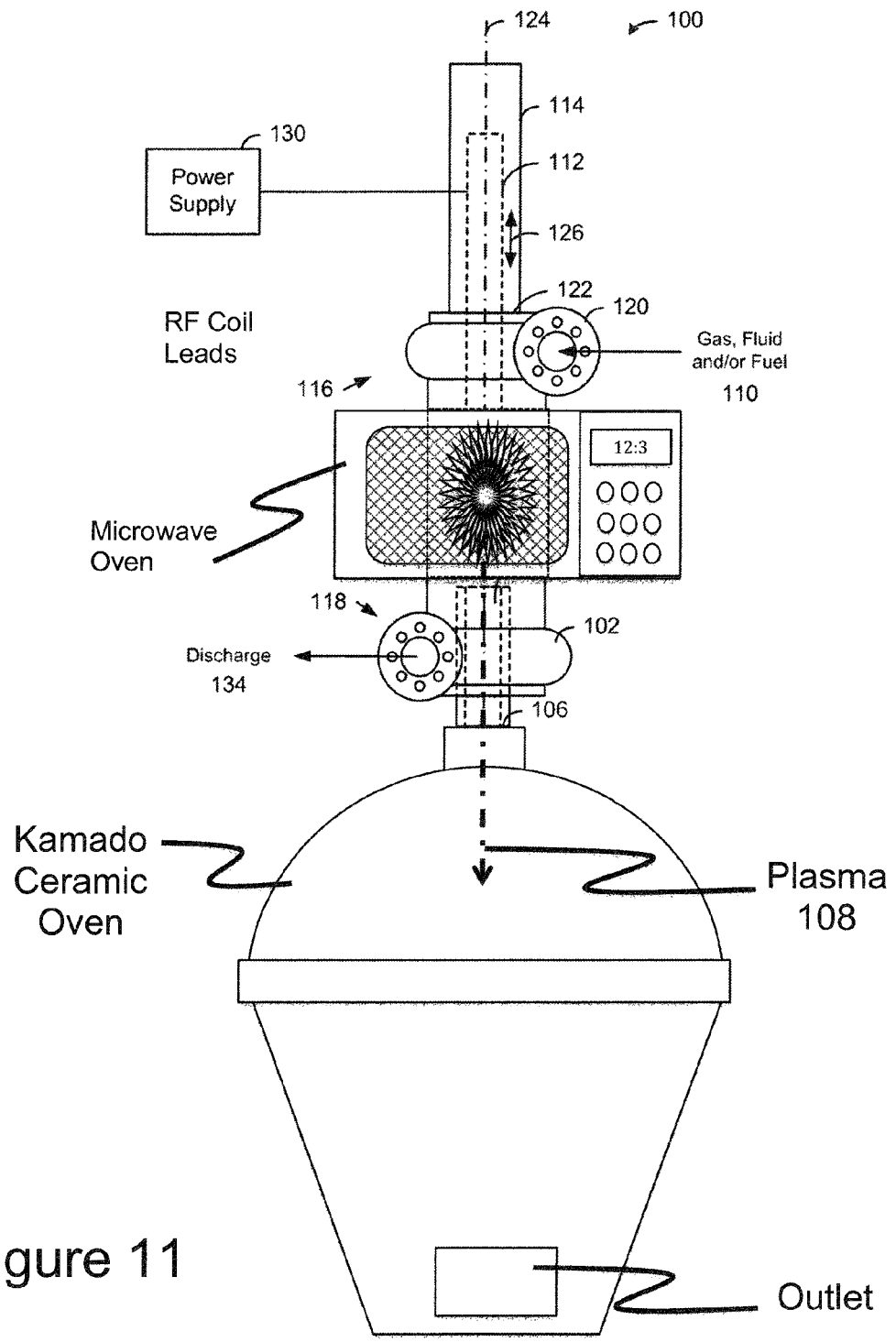
FIG. 11 is a diagram of a microwave inductively coupled plasma arc torch in accordance with one embodiment of the present invention.

The simplicity of the present invention is illustrated in FIG. 11, which is a diagram of a microwave inductively coupled plasma arc torch in accordance with one embodiment of the present invention. The plasma arc torch 100 is partially placed within a microwave oven, by first drilling a hole through the top and bottom of the microwave oven. A microwave permeable material such as quartz glass, alumina and/or sapphire is used as the vessel 104. Volutes 116 and 118 are reattached to the vessel 104 on the exterior top and bottom of the microwave oven. It will be understood that the anode nozzle 106 and tangential discharge 134 may be located on the top of the microwave oven in order to keep hot gases flowing upwards. The orientation of the plasma arc torch 100 is based upon its use. For example, by utilizing the orientation in the current configuration a unique downdraft plasma gasifier can be constructed by simply using an ancient clay cooker called a "kamado." Big Green Eggs® and generic kamado clay cooker are commonly available in stores.

Returning to FIG. 11, anode nozzle 106 would be attached to the top of the kamado clay cooker's exhaust. Metal screens supplied with the kamado would be removed or can be used to support biomass. Biomass or garbage would be placed inside the kamado by simply lifting the lid. Syngas would be piped from the bottom outlet of the kamado. Likewise, the device as disclosed in FIG. 11 can be attached to the bottom outlet of the kamado and operated as an updraft gasifier.

Another unique feature of the present invention is that natural gas or propane and water can be used as the plasma gas. A water mister would be attached to the inlet line of the propane 110 feeding into inlet 120. Thus, the propane would be steam reformed and the hot syngas plasma would gasify any biomass within the kamado. However, a small steam generator can be built by simply coiling copper tubing and using it to cool the syngas. The water will be converted to steam and is used as the fluid 110 in the inductively coupled plasma arc torch 100. The DC power supply can be a battery, small DC welder or an alternator turned by a gas type engine fired on the syngas produced from the Kamado IC Plasma Arc System.

Figure 12:
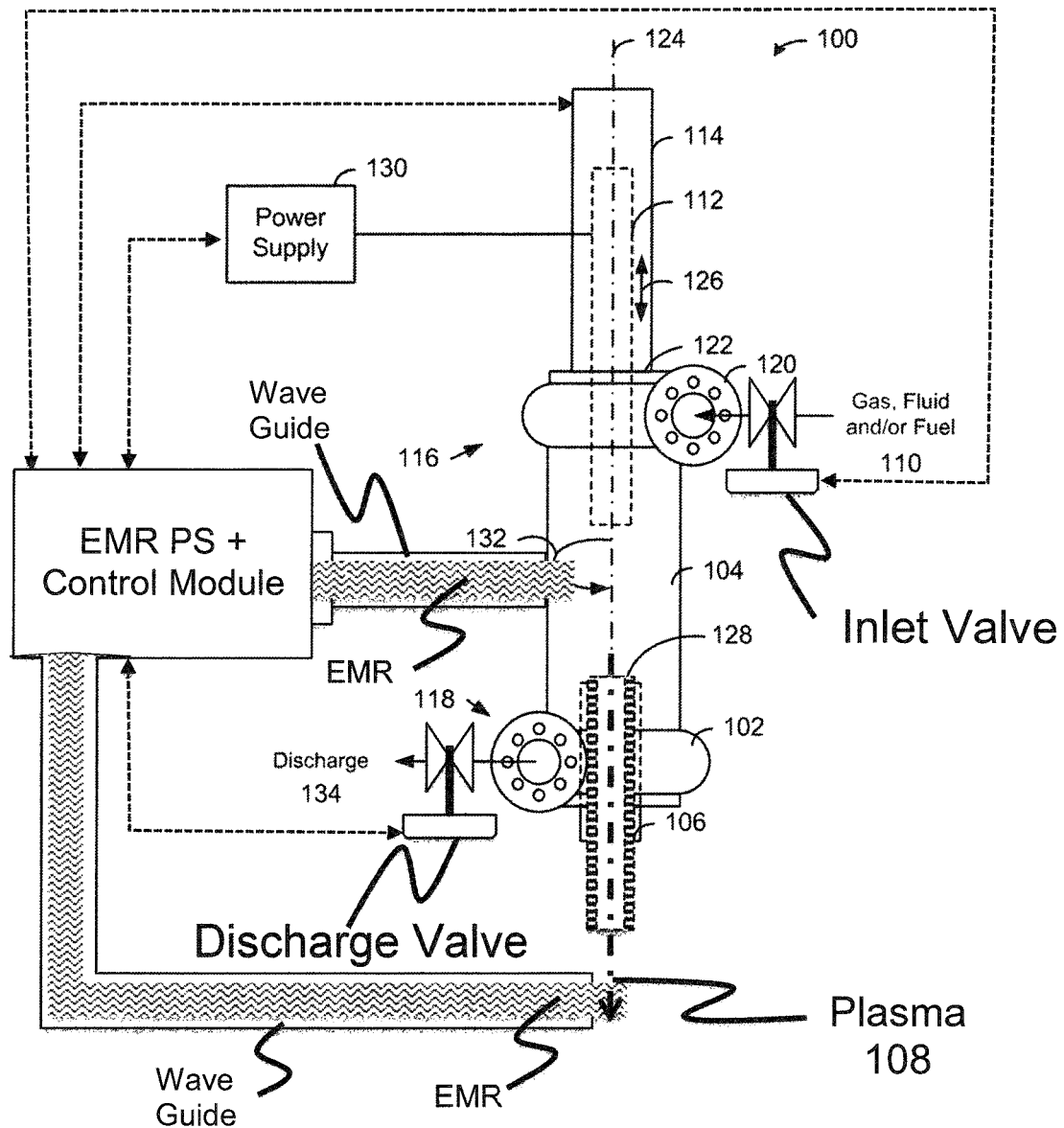
FIG. 12 is a diagram of a master and slave microwave inductively coupled plasma arc torch in accordance with one embodiment of the present invention.

Now referring to FIG. 12, a diagram of a master and slave microwave inductively coupled plasma arc torch in accordance with one embodiment of the present invention is shown. For commercial and industrial applications, the plasma arc torch 100 is improved by coupling with microwaves. A waveguide is attached to the vessel 104 in order to emit EMR into the plasma arc torch 100. It is well known that EMR within the microwave frequency range will couple to graphite, electrons and plasma. The plasma arc torch 100 may include another waveguide for irradiating the plasma 108 and free electrons exiting from the anode nozzle 106

Figure 13:
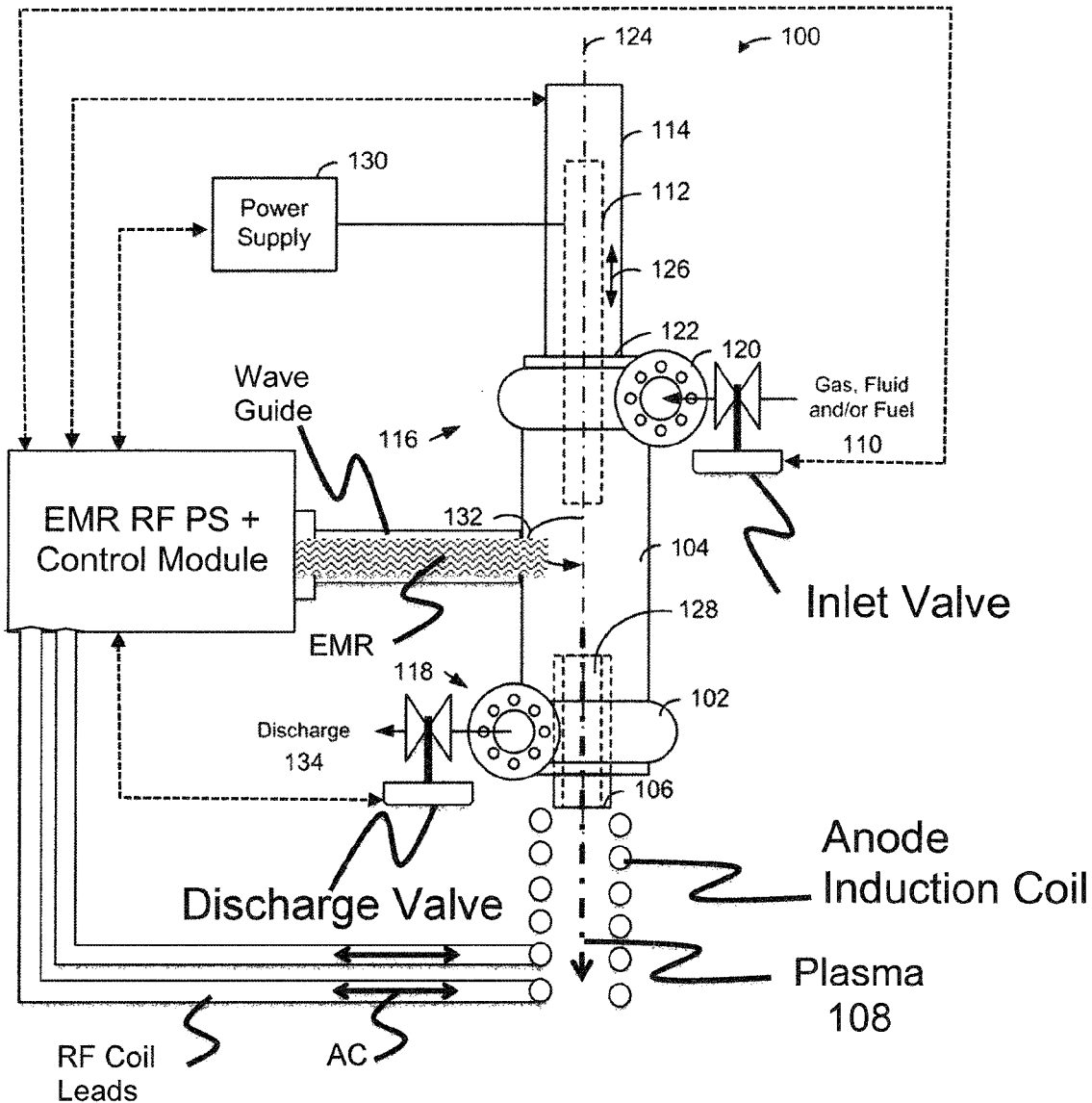
FIG. 13 is a diagram of a dual frequency inductively coupled plasma arc torch in accordance with one embodiment of the present invention.

Referring now to FIG. 13, a diagram of a dual frequency inductively coupled plasma arc torch in accordance with one embodiment of the present invention is shown. EMR at a higher frequency, such as microwave frequency range from 900 MHz to 2.45 GHz, is used to sustain the plasma 108 and energize free electrons while a second EMR source at a different frequency, such as 10 to 400 KHz is used to inductively couple to the anode nozzle 106, plasma 108 or free electrons. Likewise, line frequency of 50 or 60 Hz may be used by simply wrapping an electrical line around the plasma arc torch 100 vessel 104 and/or the anode nozzle 106.

Figure 14:
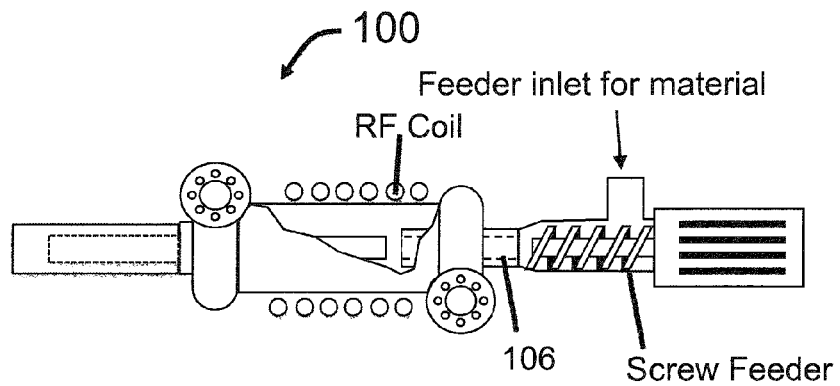
FIG. 14 is a diagram of an inductively coupled plasma arc torch screw feeder in accordance with one embodiment of the present invention.

Now referring to FIG. 14, a diagram of an inductively coupled plasma arc torch screw feeder in accordance with one embodiment of the present invention is shown. As previously stated the plasma arc torch is in itself is a plasma reactor. The present invention shown in FIG. 14 has been built, tested and found to produce unexpected results.

Several different types of biomass were fed through the hollow anode 106. The screw feeder stopped feeding material. The system was disassembled and a carbon ball was found within the anode nozzle 106. The carbon ball had no odor and when crushed a white material was found within the center. It is believed that minerals such as calcium were concentrated in the center. It will be understood that any material can be backflowed through the anode nozzle. The plasma arc torch 100 can be dramatically enhanced with an induction coil. The RF energy will couple to the graphite nozzle, thus heating it to assist in carbonization of feedstock. Likewise, a frequency can be chosen to couple to the arc and/or the plasma.

Now turning back to FIG. 1, the discharge 134 is necessary in order to operate in this configuration. All other plasma torches are designed to produce a plasma and discharge the plasma from a nozzle. The improved IC plasma arc torch 100 as disclosed in FIG. 14 allows for a very simple design for a gasifier, gas cracker, furnace and/or pyrolysis system.

Figure 15:
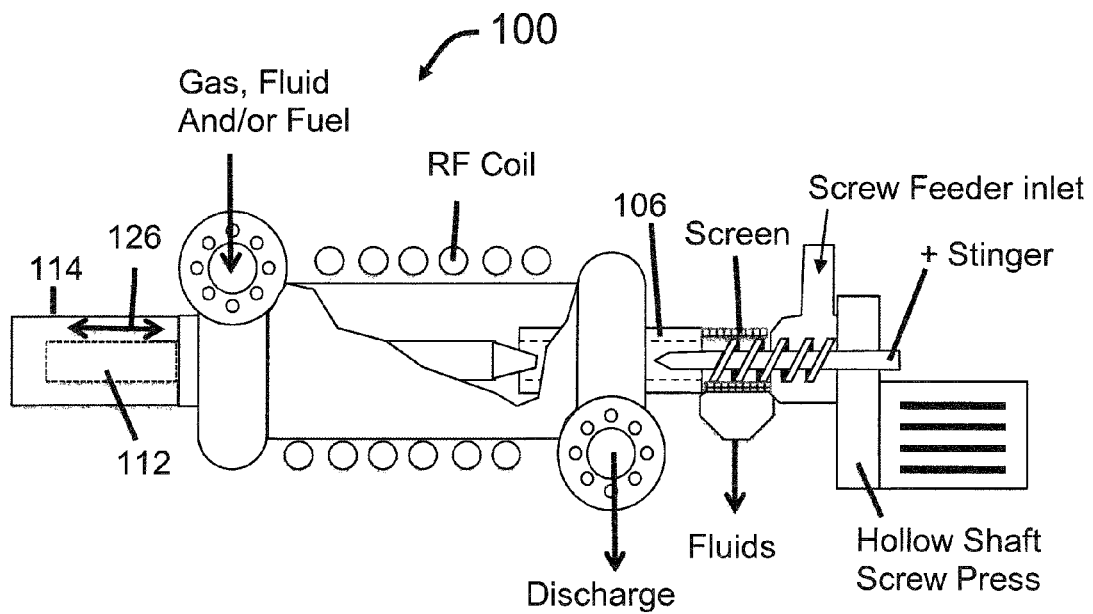
FIG. 15 is a diagram of an inductively coupled plasma arc torch screw press in accordance with one embodiment of the present invention.

Referring now to FIG. 15, a diagram of an inductively coupled plasma arc torch screw press in accordance with one embodiment of the present invention is shown. The novelty of the present invention's linear actuator electrode can be fully appreciated when operated with a screw press. Screw presses typically use an actuator to hold back the solids in order to squeeze and press the liquids from the solids. The linear actuator coupled to the cathode electrode 112 is used to maintain pressure against material within the hollow anode nozzle 106. A hollow shaft screw further improves the system by inserting a positive grounded stinger down the bore of the hollow shaft. This allows for feeding both electrodes from opposite ends, thus overcoming the number one problem with plasma torches—electrode life. Hence, by continually feeding graphite electrodes, the system does not need to be shut down. Graphite electrodes with boxes and pins that screw together are very common and are used throughout the metal industry in carbon arc furnaces as well as for carbon arc gouging.

The invention as disclosed in FIG. 15 allows for dewatering solids while simultaneously treating the solids with high temperature plasma. The induction coil allows for induction heating of the anode nozzle 106 the cathode electrode 112 as well as coupling to the plasma and the arc. Where DC power and the arc come into play is when material begins to carbonize it then becomes electrically conductive. However, at the onsite of carbonization the material will act as a resistor. Thus, the material can be efficiently heated with resistive heating via DC power. The gas, fluid and/or fuel 110 utilized is based upon the desired output for example quenching the hot carbon balls with water. Likewise, this configuration allows for scrubbing any gases produced by using an alkaline solution.

Figure 16:
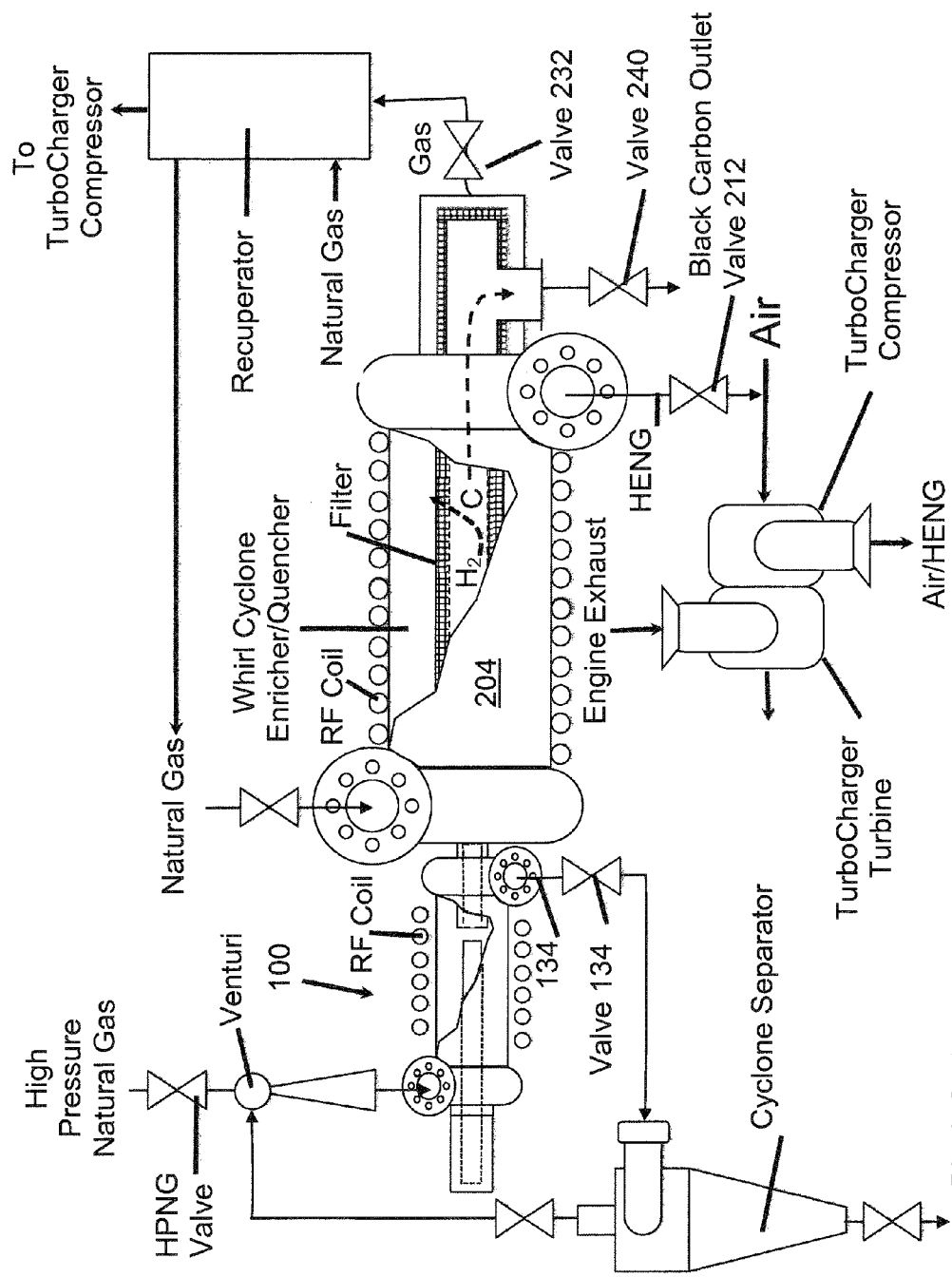
FIG. 16 is a diagram of an inductively coupled plasma arc torch hydrogen enrichment system in accordance with one embodiment of the present invention.

Referring to FIG. 16, an inductively coupled plasma arcwhirl torch cracker is disclosed in another embodiment of the present invention. In lieu of adding air to the Whirl/Vortex Combustor as disclosed in FIGS. 2, 3, 4, 5 and 6, natural gas ("NG") or any quenching fluid is flowed into the whirl combustor. In order to be brief, NG will be used as an example for the quench fluid. NG is flowed into the plasma arc torch 100 to begin cracking NG, ethane, butane or propane into hydrogen and black carbon. Since hydrogen is less dense then carbon it will seek the center of the whirling cyclone within the plasma arc torch 100. Consequently, black carbon being more dense will be forced to the outside or periphery wall of the whirling cyclone within the plasma arc torch 100.

Another novel feature of the present invention lies in part of the whirling black carbon near the vessel 204 wall. The EMR from the induction coil will couple to the black carbon and inductively heat the black carbon. This will ensure that any and all volatile material will be volatilized, thus producing a fairly clean black carbon. Furthermore, the addition of the Induction Coil allows for cofeeding biomass, coal, coke or any carbonaceous material with a fluid directly into plasma arc torch 100 with a venturi.

Since a cyclone separator is not a perfect separator some carbon will be entrained within the hydrogen and flow through the electrode nozzle. Hence the high temperature filter attached to the electrode nozzle. The filter traps the carbon ("C") and only allows hydrogen ("H2") to pass through it as shown by arrows H2 and C. Thus, by coupling the Whirl/Vortex Enricher/Quencher to a very novel inductively coupled plasma arc torch cracker the amount of hydrogen produced and flowed can be easily controlled for hydrogen enriching any fuel.

By throttling valve HPNG and valve 134 hydrogen production and NG recirculation dictates how much hydrogen flows through the electrode nozzle and into the Whirl/Vortex Enricher. For example, shutting valve HPNG eliminates hydrogen production. Fully opening valve HPNG and shutting valve 134 maximizes hydrogen production. However, carbon will be entrained with the hydrogen and removed via the filter. In order to operate in a preferred carbon capture mode, valve HPNG is throttled to produce a vacuum within the venturi. The venturi pulls a suction on a cyclone separator. Valve 134 is throttled to allow carbon, uncracked NG and some hydrogen into the cyclone separator. Carbon is removed and uncracked NG and hydrogen are recycled via the venturi.

The hydrogen and some carbon enter into the Whirl/Vortex Enricher/Quencher. Only hydrogen passes through the filter. An ideal porous material for the filter is carbon foam manufactured by CFOAM. CFOAM is electrically conductive but not thermally conductive. It is a good thermal insulator. Hence, it will aid in trapping the heat to ensure that NG within the filter is further cracked to hydrogen and carbon.

When the hydrogen permeates through the porous filter media, it quickly mixes with the NG whirling within the Enricher. Likewise, the cool NG quickly quenches and absorbs the heat from the hot hydrogen gas.

The Hydrogen Enriched Natural Gas ("HENG") exits the Whirl Enricher and flows into a centrifugal compressor of a turbocharger or turbocompressor. It may or may not be entrained with air for premixing prior to combustion. Although not shown, a plasma arc lean combustion turbine operating on hydrogen may be used to drive the turbine of the turbocharger.

The valves 212 and 232 as disclosed in FIG. 2 allow for the plasma arc cracker to be cleaned online by simply shutting valve 212 and opening valve 232. Referring to both FIG. 16 and FIG. 2, NG will flow from outside to inside the filter and the mixture of hydrogen and natural gas will flow through valve 232 while carbon will exit through valve 240. The gas mixture then flows into a recuperator then the compressor of the turbocharger. Thus, the filter is cleaned while still producing hydrogen and enriching natural gas or any other fuel. Now, by adding an induction coil around the whirl cyclone enricher and quencher it enhances the performance of the system by ensuring the filter is operated at a high temperature, by also allows for preheating any fluid backflowed through the filter for cleaning purposes. Air, oxygen or steam may be backflowed to remove the carbon trapped within the porous spaces of the filter.

Figure 17:
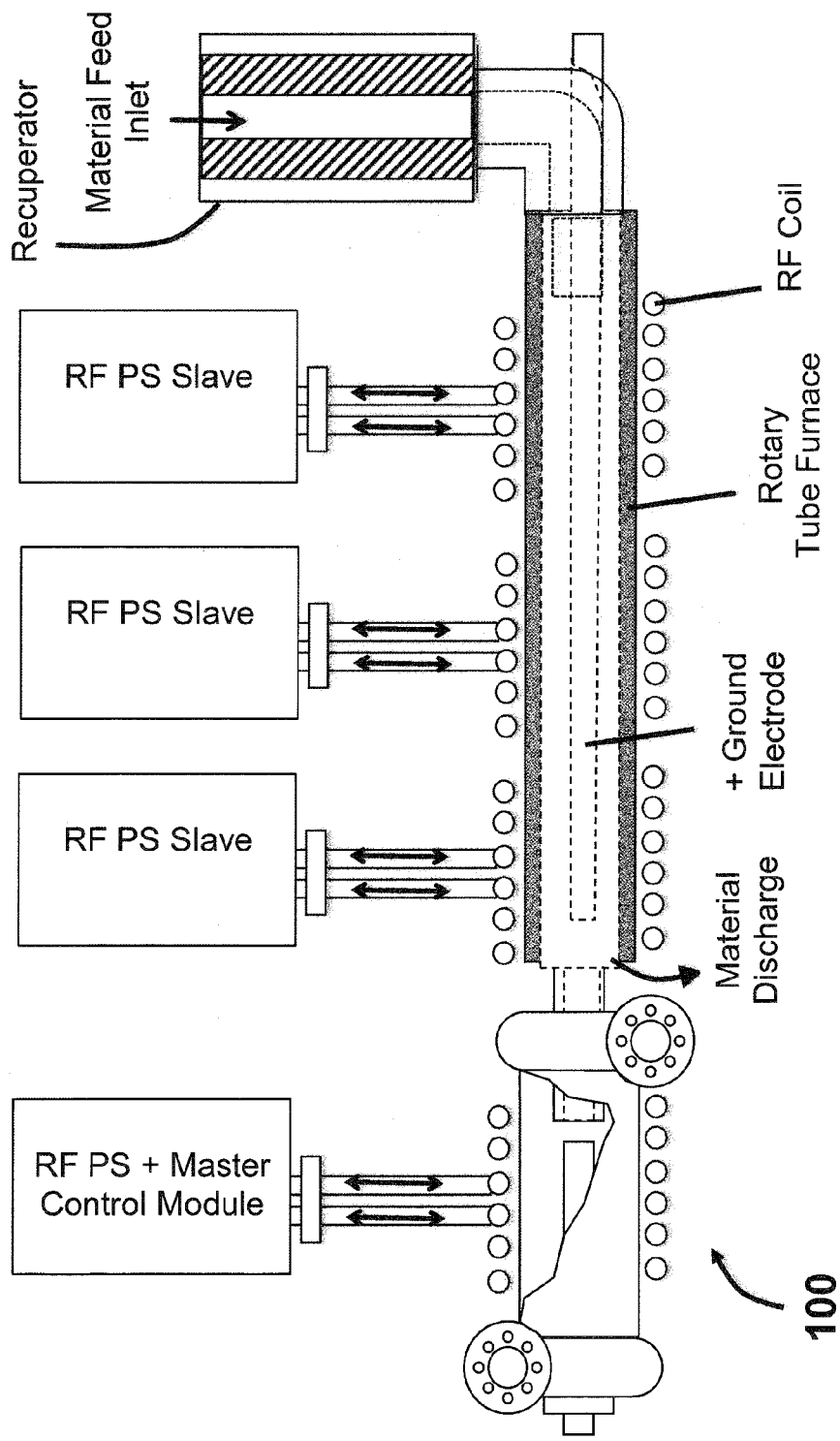
FIG. 17 is a diagram of an inductively coupled plasma arc torch rotary tube furnace in accordance with one embodiment of the present invention.

Now referring to FIG. 17, a diagram of an inductively coupled plasma arc torch rotary tube furnace in accordance with one embodiment of the present invention is shown. The inductively coupled plasma arc torch 100 is directly attached to discharge its plasma into an induction rotary tube furnace with induction coils located on the periphery of the tube. The rotary furnace tube may be selected from an RF permeable (quartz, sapphire, alumina) or RF absorbing material (graphite, silicon carbide, tungsten carbide, molybdenum, stainless steel, Kanthal®, tantalum, etc.). For example, if the furnace tube is graphite, then temperatures in excess of 5,000° F. can be reached and maintained within the rotary graphite furnace via induction heating of the rotary graphite tube. In this mode of operation a fuel gas would be used that can be cracked to hydrogen and black carbon in order to operate in an inert atmosphere. However, any inert gas may be used and recycled. A recuperator allows for preheating material while also allowing for preheating the gas to used in plasma archwhirl torch 100. An ideal use for the aforementioned inductively coupled plasma arcwhirl rotary furnace tube is for manufacturing and sintering proppants.

Proppants are used to fracture oil and gas wells. Currently, proppants are sintered with long rotary kilns fired with natural gas. There are many problems associated with long rotary kilns, however the number one issue is relining the kiln with refractory. Another major issue is that proppants must be fired at 2,900° F. Thus, at this temperature, NOx emissions are a problem for rotary kilns. The IC Plasma Arc Rotary Graphite Furnace Tube allows for sintering proppants in an inert atmosphere, thus allowing for higher firing temperatures, shorter residence times and zero emissions by recycling an inert gas.

On the other hand, the IC Plasma Arc Rotary Furnace may be operated in an oxidizing atmosphere. For example, if the rotary tube is made of alumina, then RF energy will inductively heat the positive ground electrode, the arc and the plasma within the rotary tube. In this mode of operation air or oxygen can be used as the plasma gas.

As previously disclosed several RF power supplies ("PS") can be stacked in order to increase total power of the system. One PS would operate as the master while the others would operate as slaves. Likewise, as previously disclosed, utilizing a stinger electrode allows for feeding electrodes from both ends for continuous duty operations.

Figure 18:
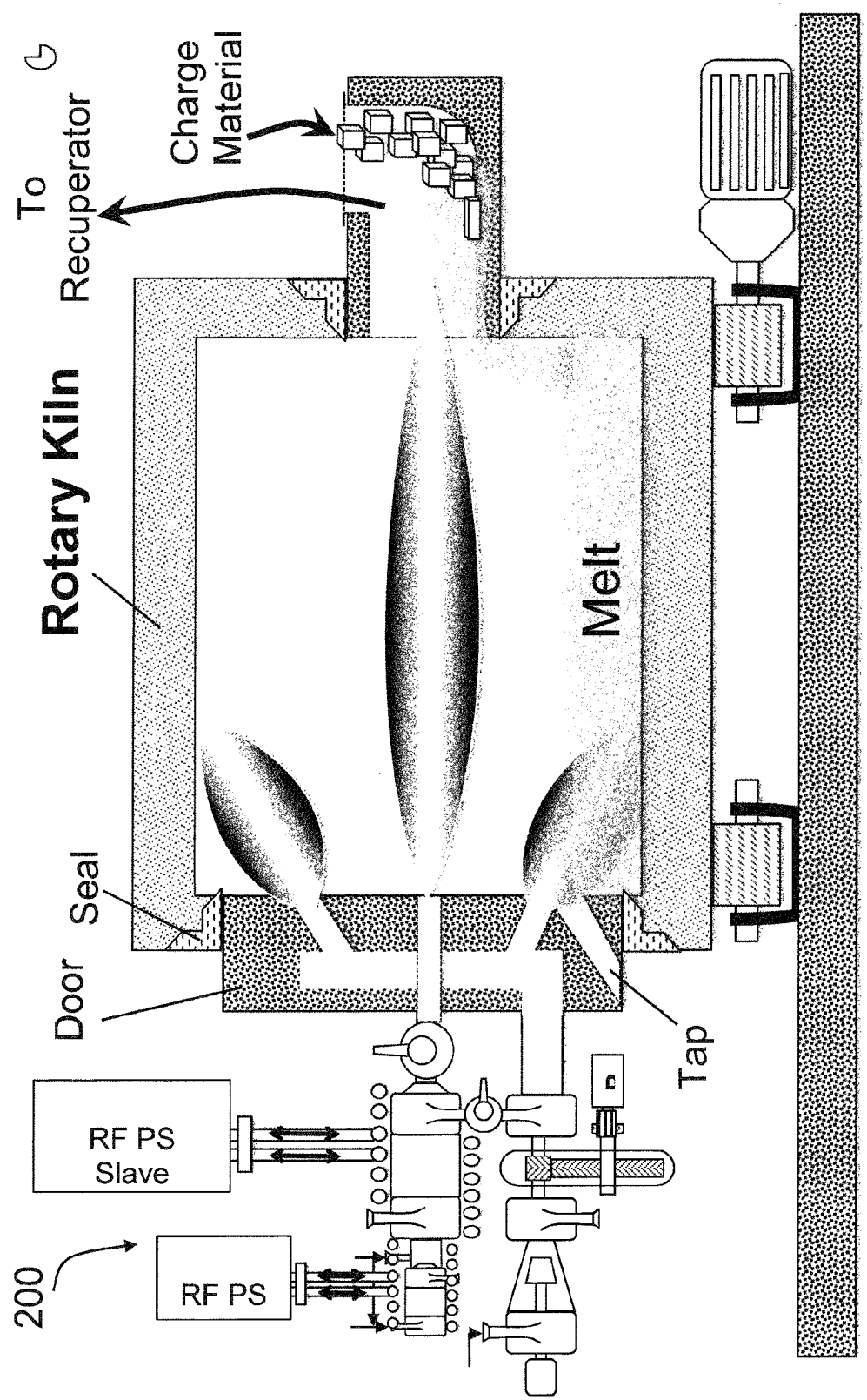
FIG. 18 is a diagram of an inductively coupled plasma arc torch rotary kiln in accordance with one embodiment of the present invention.

Referring now to FIG. 18, a diagram of an inductively coupled plasma arc torch rotary kiln in accordance with one embodiment of the present invention is shown. The plasma arc turbine torch 200 may be attached to any rotary kiln. The plasma arc torch 100 is easily retrofitted into an inductively coupled plasma torch by adding RF coils. By attaching the present invention to a rotary kiln and by first lean and/or rich combusting a fuel and/or gasifying biomass, the hot combustion gases can drive a turbogenerator as previously disclosed. This in turn provides the electrical power to the DC and RF power supplies. Thus, facilities operating in areas that have high electrical costs can operate off the grid by using a hydrocarbon fuel or renewable fuels such as biomass, wind or solar. Likewise, since it is well known that exhaust gas temperatures from modern day turbochargers can reach 1,800° F., then the hot exhaust from the turbine is piped into the rotary furnace door is shown. The central exhaust nozzle fired directly down the center of the rotary kiln. The turbine exhaust is directed tangentially down and up by to form yet another WHIRLING hot gas. The melt is tapped via a tap hole. Hot gases exit to a recuperator (not shown) to preheat combustion air. Charge material is fed on the opposite end of the rotary kiln. This system would be ideal for recovering aluminum from aluminum dross, aluminum cans and Tetra Pack® fluid containers.

The foregoing description of the apparatus and methods of the invention in preferred and alternative embodiments and variations, and the foregoing examples of processes for which the invention may be beneficially used, are intended to be illustrative and not for purpose of limitation. The invention is susceptible to still further variations and alternative embodiments within the full scope of the invention, recited in the following claims.

What is claimed is:

1. An inductively coupled plasma device comprising:
   a cylindrical vessel having a first end and a second end, wherein at least a portion of the cylindrical vessel is transparent or semi-transparent to a wave energy;
   a tangential inlet connected to or proximate to the first end;
   a tangential outlet connected to or proximate to the second end;
   an electrode housing connected to the first end of the cylindrical vessel such that a first electrode is (a) aligned with a longitudinal axis of the cylindrical vessel, and (b) extends into the cylindrical vessel;
   a hollow electrode nozzle connected to the second end of the cylindrical vessel such that the center line of the hollow electrode nozzle is aligned with the longitudinal axis of the cylindrical vessel;
   an electromagnetic radiation source that produces a wave energy and is disposed around or within the cylindrical vessel; and
   wherein (a) the tangential inlet and the tangential outlet create a vortex within the cylindrical vessel, (b) the first electrode and the hollow electrode nozzle create a plasma that discharges through the hollow electrode nozzle, and (c) the wave energy from the electromagnetic radiation source couples to the first electrode, the hollow electrode nozzle, the plasma or a combination thereof.

2. The inductively coupled plasma device as recited in claim 1, wherein the electromagnetic radiation source comprises one or more induction coils, a microwave source, or a waveguide coupled to the microwave source.

3. The inductively coupled plasma device as recited in claim 1, wherein at least a portion of the cylindrical vessel is transparent or semi-transparent to the wave energy, and comprises alumina, plastic, glass or fiberglass.

4. The inductively coupled plasma device as recited in claim 1, wherein at least a portion of the cylindrical vessel absorbs the wave energy produced by the electromagnetic radiation source, emits an infrared radiation towards the longitudinal axis, and comprises graphite or silicon carbide.

5. The inductively coupled plasma device as recited in claim 1, further comprising a second electromagnetic radiation source disposed adjacent to the hollow electrode nozzle.

6. The inductively coupled plasma device as recited in claim 5, wherein the second electromagnetic radiation source comprises one or more induction coils, a microwave source, or a waveguide coupled to the microwave source.

7. The inductively coupled plasma device as recited in claim 5, further comprising:
   a master power supply connected to the electromagnetic radiation source; and
   a slave power supply connected to the second electromagnetic radiation source.

8. The inductively coupled plasma device as recited in claim 1, further comprising a parabolic reflector having a vertex, a focus and an opening at the vertex, wherein the opening is connected to the hollow electrode nozzle such that the vertex and focus are axially aligned with the longitudinal axis and the focus is not located within the hollow electrode nozzle.

9. The inductively coupled plasma device as recited in claim 7, further comprising a ground anode stinger electrode that extends into the parabolic reflector proximate to the focus wherein the ground anode stinger electrode is spaced apart and axially aligned with hollow electrode nozzle.

10. The inductively coupled plasma device as recited in claim 7, further comprising a second electromagnetic radiation source disposed around or within the parabolic reflector.

11. The inductively coupled plasma device as recited in claim 1, further comprising:
    an inlet valve connected to the tangential inlet; and
    a discharge valve connected to the tangential outlet.

12. The inductively coupled plasma device as recited in claim 1, further comprising a ceramic oven connected to the hollow electrode nozzle.

13. The inductively coupled plasma device as recited in claim 1, further comprising a screw feeder attached to the hollow electrode nozzle that feeds a material directly into the hollow electrode nozzle.

14. The inductively coupled plasma device as recited in claim 13, further comprising:
    a screen disposed around a screw of the screw feeder; and
    a fluid discharge conduit disposed below the screen.

15. The inductively coupled plasma device as recited in claim 13, wherein a screw of the screw feeder has a hollow shaft and a stinger electrode extends through the hollow shaft into the hollow electrode nozzle.

16. The inductively coupled plasma device as recited in claim 1, further comprising a cyclone enricher/quencher connected to the hollow electrode nozzle.

17. The inductively coupled plasma device as recited in claim 16, wherein the cyclone enricher/quencher comprises:
    a second cylindrical vessel aligned with the longitudinal axis of the cylindrical vessel, wherein the second cylindrical vessel has a first end connected to the hollow electrode nozzle and a second end;
    a tangential inlet connected to or proximate to the first end;
    a tangential outlet connected to or proximate to the second end; and
    a cylindrical filter disposed within the second cylindrical vessel and aligned with the longitudinal axis of the cylindrical vessel that separates solids and gases.

18. The inductively coupled plasma device as recited in claim 17, wherein an enclosed portion of the cylindrical filter extends through the second end of the second cylindrical vessel and has a first outlet for the solids and a second outlet for the gases.

19. The inductively coupled plasma device as recited in claim 17, further comprising a second electromagnetic radiation source disposed around or within the second cylindrical vessel.

20. The inductively coupled plasma device as recited in claim 19, wherein the second electromagnetic radiation source comprises one or more induction coils, a microwave source, or a waveguide coupled to the microwave source.

21. The inductively coupled plasma device as recited in claim 1, further comprising a rotary furnace tube connected to the hollow electrode nozzle.

22. The inductively coupled plasma device as recited in claim 21, wherein the rotary furnace tube comprises a graphite tube.

23. The inductively coupled plasma device as recited in claim 21, further comprising a second wave energy source disposed around or within the rotary furnace tube.

24. The inductively coupled plasma device as recited in claim 23, wherein the second electromagnetic radiation source comprises one or more induction coils, a microwave source, or a waveguide coupled to the microwave source.

25. The inductively coupled plasma device as recited in claim 21, further comprising a ground electrode disposed within and aligned with the rotary furnace tube.

26. The inductively coupled plasma device as recited in claim 21, further comprising a recuperator attached to the rotary furnace tube.

27. The inductively coupled plasma device as recited in claim 21, wherein the rotary furnace tube further comprises a material discharge adjacent to the hollow electrode nozzle.

28. The inductively coupled plasma device as recited in claim 1, further comprising:
   a cyclone combustor connected to the hollow electrode nozzle, wherein the cyclone combustor has a tangential entry, a tangential exit and an exhaust outlet;
   a turbocharger having a turbine connected to a compressor via a shaft, where a turbine entry is connected to the tangential exit of the cyclone separator and the compressor exit is connected to the tangential entry of the cyclone combustor; and
   a rotary kiln connected to the exhaust outlet of the cyclone combustor.

29. The inductively coupled plasma device as recited in claim 1, wherein the first electrode is hollow and a fuel is introduced into the hollow first electrode.

30. The inductively coupled plasma device as recited in claim 1, wherein a fuel is introduced into the tangential inlet of the plasma arc torch.

31. The inductively coupled plasma device as recited in claim 1, wherein a fuel is introduced into the plasma that discharges through the hollow electrode nozzle.

32. The inductively coupled plasma device as recited in claim 1, wherein a gas, a fluid or steam is introduced into the tangential inlet of the plasma arc torch.

* * * * *